(12) United States Patent
Shimada et al.

(10) Patent No.: US 8,476,372 B2
(45) Date of Patent: Jul. 2, 2013

(54) POLYESTER FIBER AND METHOD FOR ITS PRODUCTION, AND TIRE CORD, TIRE, BELT-REINFORCING FIBER MATERIAL AND BELT COMPRISING THE POLYESTER FIBER

(75) Inventors: Shintaro Shimada, Ibaraki (JP); Junichi Togasaki, Matsuyama (JP); Fuyuki Terasaka, Matsuyama (JP); Seiji Ito, Ibaraki (JP)

(73) Assignee: Teijin Fibers Limited, Osaka (JP)

( * ) Notice: Subject to any disclaimer, the term of this patent is extended or adjusted under 35 U.S.C. 154(b) by 348 days.

(21) Appl. No.: 12/933,388

(22) PCT Filed: Jan. 12, 2010

(86) PCT No.: PCT/JP2010/050456
§ 371 (c)(1),
(2), (4) Date: Sep. 17, 2010

(87) PCT Pub. No.: WO2010/082643
PCT Pub. Date: Jul. 22, 2010

(65) Prior Publication Data
US 2011/0017378 A1    Jan. 27, 2011

(30) Foreign Application Priority Data

Jan. 16, 2009   (JP) .................................. 2009-007581
Sep. 4, 2009    (JP) .................................. 2009-204818
Sep. 7, 2009    (JP) .................................. 2009-205900
Sep. 7, 2009    (JP) .................................. 2009-205901

(51) Int. Cl.
*C08F 283/02* (2006.01)

(52) U.S. Cl.
USPC ........... 525/255; 152/450; 152/458; 152/548; 524/132; 524/135; 524/439; 524/440

(58) Field of Classification Search
USPC ........... 525/255; 152/450, 458, 548; 524/132, 524/135, 439, 440
See application file for complete search history.

(56) References Cited

U.S. PATENT DOCUMENTS

| 5,242,645 A | 9/1993 | Sasamoto et al. |
| 7,199,172 B2 * | 4/2007 | Rule .............................. 524/395 |
| 7,501,373 B1 | 3/2009 | Nakajima et al. |
| 7,951,860 B2 * | 5/2011 | zur Loye et al. .............. 524/124 |
| 2003/0221707 A1 | 12/2003 | Blanton et al. |
| 2005/0164092 A1 | 7/2005 | Alberti et al. |
| 2005/0239938 A1 | 10/2005 | Rule |
| 2008/0095852 A1 | 4/2008 | Kong et al. |
| 2008/0114106 A1 | 5/2008 | Kaliaguine et al. |

FOREIGN PATENT DOCUMENTS

| JP | 10-168660 A | 6/1998 |
| JP | 11-241281 A | 9/1999 |
| JP | 2001-098418 A | 4/2001 |
| JP | 2007-534801 A | 11/2007 |

* cited by examiner

*Primary Examiner* — Peter Szekely
(74) *Attorney, Agent, or Firm* — Sughrue Mion, PLLC

(57) ABSTRACT

There is provided a polyester fiber which has few defects such as voids due to catalyst particles, and low variation in physical properties and minimal fluff generation. The polyester fiber of the invention comprises laminar nanoparticles composed of a divalent metal and a phosphorus compound and having side lengths of 5-100 nm and an interlayer spacing of 1-5 nm. There are also provided a tire cord, tire, belt-reinforcing fiber material and belt, comprising the polyester fiber.

19 Claims, 3 Drawing Sheets

POLYESTER FIBER AND METHOD FOR ITS PRODUCTION, AND TIRE CORD, TIRE, BELT-REINFORCING FIBER MATERIAL AND BELT COMPRISING THE POLYESTER FIBER

TECHNICAL FIELD

The present invention relates to a high-strength polyester fiber that is generally useful as a reinforcing fiber for industrial materials and specifically for fiber/polymer complexes, as well as a method for production of the same. The invention further relates to a tire cord comprising the polyester fiber, and particularly to a tire cord for a tire with excellent running stability and durability, and a tire employing it. The invention still further relates to a belt-reinforcing fiber material comprising the polyester fiber, and especially to a belt-reinforcing fiber material with excellent dimensional stability and fatigue resistance, and a belt employing it.

BACKGROUND ART

Since polyester fiber has many excellent properties including high tenacity, high Young's modulus and heat-resistant dimensional stability, it is used in a wide range of fields including clothing and industrial use. The physical properties of polyester fiber are known to differ significantly depending on the type of catalyst used for polycondensation of the polymer.

For example, antimony compounds are widely used as polycondensation catalysts for polyethylene terephthalate fibers because of their excellent performance as polycondensation catalysts. Also, examples of addition of specific phosphorus compounds are described in Patent document 1 and elsewhere. Patent document 2 describes examples of using reaction products of titanium compounds and phosphorus compounds.

Even when such catalysts are used, however, the effect of improvement in the spinning property is inadequate, and even more improvement in the spinning property is desirable. Lower spinning properties lead to variation in the properties of the obtained fiber, and hence a demand exists for higher performance polyester fiber.

Incidentally, it has become common in recent years to use cords made of polyester fibers, as carcass materials in radial tires for passenger vehicles. This is because the polyester fibers are even lower cost materials, with an excellent balance of properties including tenacity, modulus and dimensional stability, compared to the conventionally used nylon fibers and rayon fibers (Patent document 3 and Patent document 4). One type of polyester fiber that has been developed is HMLS (High Modulus-Low Shrinkage) polyester fiber, obtained by high-speed spinning and having excellent dimensional stability and an excellent modulus, and using HMLS polyester fiber as the carcass material in radial tires for passenger vehicles can contribute to improved maneuvering stability of the tires, as well as increased uniformity.

On the other hand, with the increasing need to reduce the environmental load associated with automobiles and raise fuel efficiency in recent years, the goal of low fuel efficiency is being pursued through lower tire rolling resistance and lighter weight, in addition to the aforementioned targets of improved maneuvering stability and greater uniformity. Methods for reducing tire weight, for example, include reducing the amount of rubber used in tires and reducing the amount of tire reinforcing material used. Even in such cases, however, still further improvement in durability and dimensional stability is desired for the carcass materials composed mainly of tire-supporting fiber. In addition, the carcass material and the actual reinforcing fiber cords composing it generate heat due to repeated stress and strain input during tire running, and this causes increased rolling resistance.

In contrast, Patent document 3 discloses a polyester fiber cord comprising polyethylene terephthalate having 0-10 mol % of isophthalic acid as an acid component and 0-10 mol % of butylene glycol and/or propylene glycol as an alcohol component copolymerized at a total of 1-10 mol %, as a polyester fiber cord that improves the maneuvering stability and the uniformity of radial tires. Copolymerization of the polyester in this method can reduce contraction of the filaments, but since copolymerization results in a lower degree of crystallinity of the fiber and larger amorphous regions in the fiber, the heat resistance and durability are lowered during cure molding and tire running, in which it is exposed to a high-temperature atmosphere.

The polyester fiber not only has excellent high strength, dimensional stability and durability, but its general utility renders it widely applicable as a low cost material for various industrial materials, including rubber reinforcement. In recent years, in particular, increasingly superior performance including reduced weight, higher energy efficiency and increased durability is being demanded for materials because of the worldwide awareness of the need to reduce environmental load. For example, polyester fibers for carrying belts such as V-belts and conveyor belts must exhibit a higher modulus and improved dimensional stability, as well as longer durability.

In this context, there have been disclosed techniques for improving the durability of polyester fibers for belts, wherein the special metal catalysts in the polyester composing the polyester fiber are modified, or copolymerizing components and antioxidants are added (see Patent document 5 and Patent document 6, for example).

However, addition of third components in these techniques can lead to reduced strength or a lower modulus, and often sufficient dimensional stability or durability cannot be achieved for the belt reinforcing fibers. The cost is also high, presenting an economical problem. Thus, belt reinforcing fibers exhibiting sufficient performance have not been obtainable in the prior art.

PRIOR ART DOCUMENTS (Patent document 1) Japanese Unexamined Patent Publication No. 62-206018
(Patent document 2) Japanese Unexamined Patent Publication No. 2002-293909
(Patent document 3) Japanese Unexamined Patent Publication No. 11-241281
(Patent document 4) Japanese Unexamined Patent Publication No. 2000-96370
(Patent document 5) Japanese Unexamined Patent Publication No. 2001-98418
(Patent document 6) Japanese Unexamined Patent Publication No. 2005-273024

SUMMARY OF THE INVENTION

Problems to be Solved by the Invention

It is an object of the present invention to provide a polyester fiber which generally has few defects such as voids due to catalyst particles, and low variation in physical properties and minimal fluff generation. It is another object of the invention to provide a polyester tire cord that exhibits excellent uniformity, running stability and durability and is suitable for a tire with reduced rolling resistance, as well as a pneumatic tire employing it. It is yet another object of the invention to provide a belt-reinforcing fiber material comprising a polyester fiber with excellent dimensional stability and fatigue resistance, and a belt employing it.

Means for Solving the Problems

In order to achieve the object stated above, the invention provides the following 1 to 18.

1. A polyester fiber which is fiber composed of polyester and comprising laminar nanoparticles composed of a divalent metal and a phosphorus compound and having side lengths of 5-100 nm and an interlayer spacing of 1-5 nm.

2. A polyester fiber according to 1. above, wherein the divalent metal is at least one type of metal element selected from the group consisting of metal elements of Periods 4-5 and Groups 3-12 of the Periodic Table, and Mg.

3. A polyester fiber according to 1. or 2. above, wherein the divalent metal is at least one metal selected from the group consisting of Zn, Mn, Co and Mg.

4. A polyester fiber according to any one of 1. to 3. above, wherein the metal-phosphorus compound is derived from a phosphorus compound represented by the following formula (I).

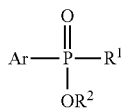

(I)

(In the formula, Ar represents an unsubstituted or substituted C6-20 aryl group, $R^1$ represents hydrogen or OH, and $R^2$ represents hydrogen or an unsubstituted or substituted C1-20 hydrocarbon group.)

5. A polyester fiber according to any one of 1. to 4. above, wherein the metal-phosphorus compound composing the laminar nanoparticles is a phenylphosphonic acid derivative.

6. A polyester fiber according to any one of 1. to 5. above, wherein the metal and phosphorus contents of the polyester satisfy the following inequality (III) and inequality (IV).

$$10 \leq M \leq 1000 \quad \text{(III)}$$

$$0.8 \leq P/M \leq 2.0 \quad \text{(IV)}$$

(In the inequalities, M represents the millimolar percent of the metal element with respect to the dicarboxylic acid component of the polyester, and P represents the millimolar percent of phosphorus element.)

7. A polyester fiber according to any one of 1. to 6. above, wherein the main repeating unit of the polyester is selected from the group consisting of ethylene terephthalate, ethylene-2,6-naphthalate, trimethylene terephthalate, trimethylene-2,6-naphthalate, butylene terephthalate and butylene-2,6-naphthalate.

8. A polyester fiber according to any one of 1. to 7. above, wherein the polyester is polyethylene terephthalate.

9. A polyester fiber according to any one of 1. to 8. above, which has a diffraction peak of 2θ=5-7° in XRD diffraction in the equatorial direction of the fiber.

10. A method for producing a polyester fiber, by melt spinning a polyester comprising laminar nanoparticles, wherein the laminar nanoparticles are composed of a divalent metal and a phosphorus compound, and have shapes with a side length of 5-100 nm and an interlayer spacing of 1-5 nm.

11. A method for producing a polyester fiber according to 10. above, wherein the laminar nanoparticles are internally precipitated by addition of the divalent metal and phosphorus compound during the production process.

12. A tire cord composed of fiber comprising a polyester fiber according to any one of 1. to 9. above.

13. A pneumatic tire obtained using a tire cord according to 12. above.

14. A pneumatic tire according to 13. above, wherein the tire cord is used for a belt and/or carcass ply set inside the tread of the pneumatic tire.

15. A belt-reinforcing fiber material composed of fiber comprising a polyester fiber according to any one of 1. to 9. above.

16. A belt-reinforcing fiber material according to 15. above, wherein the belt-reinforcing fiber material is a twisted fiber cord.

17. A belt-reinforcing fiber material according to 15. above, wherein the belt-reinforcing fiber material is a woven fabric, and the warp yarn is yarn composed of a polyester fiber.

18. A belt made of a belt-reinforcing fiber material according to any one of 15. to 17. above, and a rubber or a resin.

Effect of the Invention

The invention according to 1. to 11. above provides a polyester fiber which has few defects such as voids due to catalyst particles, and low variation in physical properties and minimal fluff generation.

The invention according to 12. to 14. above provides a polyester tire cord that exhibits excellent uniformity, running stability and durability and is suitable for a tire with reduced rolling resistance, as well as a pneumatic tire employing it.

The invention according to 15. to 18. provides a belt-reinforcing fiber material comprising a polyester fiber with excellent dimensional stability and fatigue resistance, and a belt employing it.

EXPLANATION OF SYMBOLS

Figure 1:
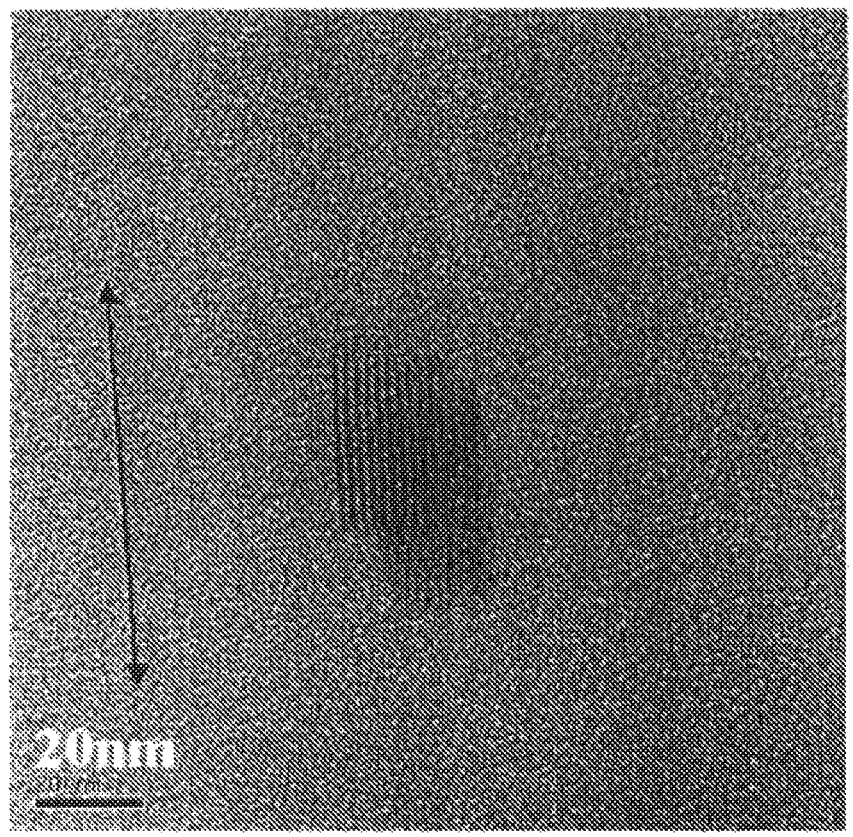
FIG. 1 is a transmission electron microscope (TEM) photograph of the polyester fiber obtained in Example 1. The arrow in the photograph indicates the fiber axis direction.
Figure 2:
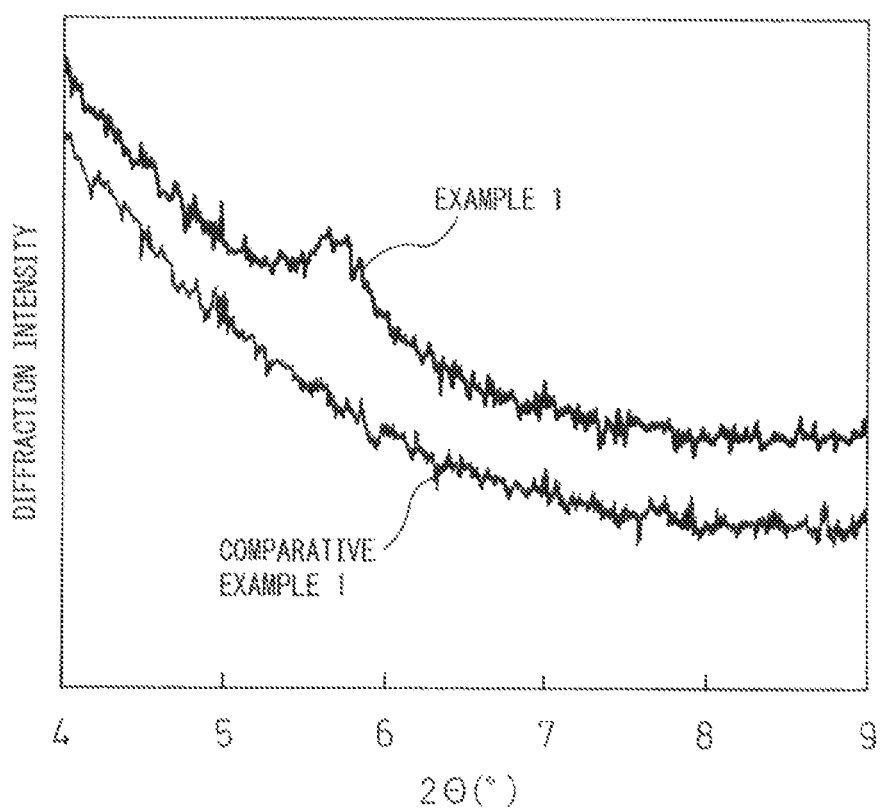
FIG. 2 shows the results of X-ray diffraction of the polyester fibers obtained in Example 1 and Comparative Example 1. Diffraction intensity is shown on the ordinate, and the angle 2θ(°) is shown on the abscissa.

1 V-Belt
2 Rubber-attached fabric
3 Core
4 Adhesive rubber layer
5 Compressed rubber layer
6 Staple fibers
7 Rib
8 V-Ribbed belt
9, 10 Pulleys

BEST MODE FOR CARRYING OUT THE INVENTION

The polyester polymer used in the polyester fiber of the invention is used as a general purpose polyester polymer having excellent properties as a rubber-reinforcing fiber in an industrial material, and particularly a tire cord or drive belt. Particularly preferred is fiber wherein the main repeating unit of the polyester is selected from the group consisting of ethylene terephthalate, ethylene-2,6-naphthalate, trimethylene terephthalate, trimethylene-2,6-naphthalate, butylene terephthalate and butylene-2,6-naphthalate. Most preferred is polyethylene terephthalate, which has excellent physical properties and is suitable for mass production. The main repeating unit of the polyester is preferably present at 80 mol % or greater with respect to all of the dicarboxylic acid components of the polyester. It is most preferably present in the polyester at 90 mol % or greater. The polyester polymer may also be a copolymer comprising an appropriate third component, so long as it is a small amount.

The polyester fiber used for the invention is a fiber composed of a polyester as described above, and it must comprise laminar nanoparticles having a side length of 5-100 nm and an interlayer spacing of 1-5 nm, wherein the laminar nanoparticles are made of a metal-phosphorus compound, and the metal element as the constituent component of the laminar nanoparticles is a divalent metal. Ordinary polyester fiber usually contains spherical catalyst-containing particles used as the transesterification catalyst/polycondensation catalyst, but the main feature of the invention is that the catalyst particles are laminar nanoparticles. While the action mechanism of the invention has not been completely established, it is believed that the laminar structure of the particle shapes in the polymer increases the surface area and results in higher surface energy activity compared to globular particles, thus accelerating the effect as a crystal nucleating agent. Furthermore, the microstructure of the catalyst fine particles, having side lengths of 5-100 nm and an interlayer spacing of 1-5 nm, further improves the crystallinity of the polymer, results in a more uniform crystal structure and accelerated microdispersion, and appropriately inhibits molecular orientation, so that the physical properties of the fiber are notably improved. The catalyst particles in this case are generally metal-containing particles.

The side lengths of the laminar nanoparticles are more preferably 6-80 nm and even more preferably 10-60 nm. The laminar nanoparticles in the polyester fiber of the invention can be confirmed using a transmission electron microscope (TEM). If the laminar nanoparticle sizes are larger than 100 nm, they will tend to act as extraneous material in the fiber, creating breaks or filament cuts, and may cause reduction in the mechanical properties such as tenacity and modulus, and hence lower durability of the tire or belt. If the particles are too small, on the other hand, it will be difficult to obtain an effect of improved crystallinity or spinning property of the polymer, with reduction in the physical properties of the obtained fiber, and especially the durability or uniformity in the case of a tire or reduced durability or dimensional stability in the case of a belt.

According to the invention the polyester fiber comprises laminar nanoparticles of no greater than 100 nm, and the laminar nanoparticles are preferably internally precipitated by addition of a divalent metal and a phosphorus compound to the polyester. When ordinary laminar particles of a laminar silicic acid salt or the like are added externally, the laminar particles tend to aggregate, and it is difficult to include such microparticles in a polyester. According to the invention, the sizes of the laminar nanoparticles that are added are no greater than 100 nm and preferably no greater than 80 nm.

The interlayer spacing between each layer of the laminar nanoparticles is preferably 1-5 nm and more preferably 1.5-3 nm. If the side lengths of the laminar nanoparticles are too long, a microstructure will not be formed and defects will become apparent. If the side lengths are too small, it will be difficult to obtain a laminar structure. The interlayer spacings between the laminar nanoparticles will normally be 1-5 nm, and preferably most are in the range of 1.5-3 nm. The interlayer spacing is the spacing between the layer composed mainly of a metal element and the layer composed of other elements such as carbon, phosphorus or oxygen. The laminar structure preferably has at least 3 layers and preferably 5-100 layers aligned in parallel. The spacing between each layer is preferably a spacing of no greater than ⅕ of the length of each layer, in the direction roughly perpendicular to the alignment of each layer.

The polyester fiber of the invention preferably has a diffraction peak at 2θ=2-7°, in wide-angle X-ray diffraction (XRD diffraction) in the equatorial direction of the fiber. This numerical value indicates that laminar nanoparticles having an interlayer spacing on the nm order are regularly oriented in the fiber axis direction. By being specifically oriented in the fiber axis direction in this way, the polyester fiber of the invention has very low yarn breakage in the polyester spinning step. That is, the productivity is drastically improved. The obtained polyester fiber also has few defects and can provide a very high level of physical properties. As a result, a tire cord with excellent durability and dimensional stability can be obtained, which when used particularly in a pneumatic tire can improve durability and uniformity while also reducing rolling resistance, or a polyester reinforcing material with excellent durability and dimensional stability can be obtained, which when used in a belt can improve the durability, dimensional stability and power transmission efficiency.

The laminar nanoparticles of the invention must be made of a metal-phosphorus compound, the metal element used as the constituent component of the laminar nanoparticles being limited to a divalent metal. Laminar nanoparticles composed of a divalent metal and a phosphorus compound are essential. The metal element is preferably one or more metal elements selected from the group consisting of metal elements of Periods 4-5 and Groups 3-12 of the Periodic Table, and Mg. Also, the laminar nanoparticles are preferably composed of a compound that includes at least one metal element selected from the group consisting of Zn, Mn, Co and Mg. Such metal elements can easily form minute laminar nanoparticles according to the invention, and also have high catalytic activity.

The laminar nanoparticles used for the invention must be composed of a metal and a phosphorus compound, and the phosphorus compound is preferably one derived from a phosphorus compound represented by the following formula (I).

(In the formula, Ar represents an unsubstituted or substituted C6-20 aryl group, $R^1$ represents hydrogen or OH, and $R^2$ represents hydrogen or an unsubstituted or substituted C1-20 hydrocarbon group.)

Examples of compounds of formula (I) include phenylphosphonic acid, monomethyl phenylphosphonate, monoethyl phenylphosphonate, monopropyl phenylphosphonate, monophenyl phenylphosphonate, monobenzyl phenylphosphonate, (2-hydroxyethyl) phenylphosphonate, 2-naphthylphosphonic acid, 1-naphthylphosphonic acid, 2-antholylphosphonic acid, 1-antholylphosphonic acid, 4-biphenylphosphonic acid, 4-methylphenylphosphonic acid, 4-methoxyphenylphosphonic acid, phenylphosphinic acid, methyl phenylphosphinate, ethyl phenylphosphinate, propyl phenylphosphinate, phenyl phenylphosphinate, benzyl phenylphosphinate, (2-hydroxyethyl)phenylphosphinate, 2-naphthylphosphinic acid, 1-naphthylphosphinic acid, 2-antholylphosphinic acid, 1-antholylphosphinic acid, 4-biphenylphosphinic acid, 4-methylphenylphosphinic acid and 4-methoxyphenylphosphinic acid.

Preferred as hydrocarbon groups for $R^2$ in the formula are alkyl, aryl and benzyl, which may be unsubstituted or substituted. The substituents of $R^2$ are preferably ones that do not hinder the tertiary structure. Substitution with hydroxyl, ester and alkoxy groups may be mentioned as examples. The aryl group represented by Ar in (I) above may be substituted with, for example, alkyl, aryl, benzyl, alkylene, hydroxyl, or a halogen atom. Preferred examples of aryl groups substituted with these substituents include the following functional groups and their isomers.

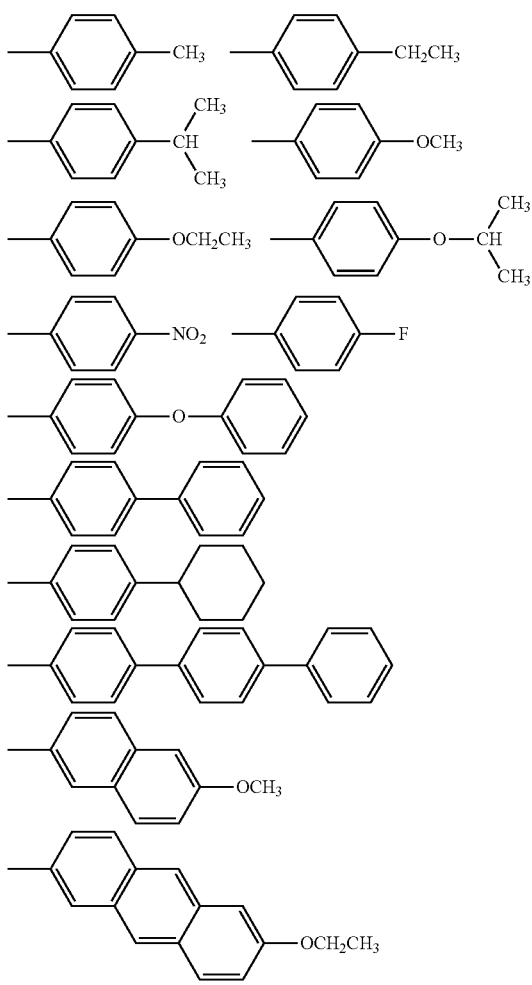

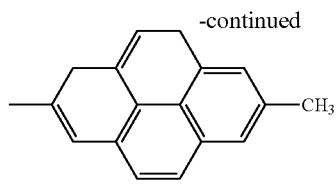

However, in the case of an alkyl diester such as dimethyl phenylphosphonate, for example, the presence of an alkyl group causes steric hindrance, and it is therefore undesirable for a laminar structure.

Addition of a phosphorus compound having such an aryl group is preferred as it will tend to produce a high crystallinity-improving effect.

Particularly suitable as such phosphorus compounds are phenylphosphonic acid, phenylphosphinic acid, and their derivatives. Phenylphosphonic acids represented by the following formula (II) and their derivatives are particularly effective as they need only be used in small amounts. From the viewpoint of physical properties, they improve the color tone and molten stability, the spinning property and the high laminar nanoparticle formability of the obtained polyester. From the standpoint of manageability, they are excellent in that they do not generate by-products during the polyester production process. Phenylphosphonic acid is most particularly preferred.

(In the formula shown above, Ar represents an unsubstituted or substituted C6-20 aryl group, and $R^2$ represents hydrogen or an unsubstituted C1-20 hydrocarbon group.)

Conversely, a dialkyl ester such as dimethyl phenylphosphonate, which has no hydroxyl groups, has a low boiling point and tends to fly off in a vacuum, and is therefore less preferable for the purpose of the present application. Fly-off of the added phosphorus compound results in a lower residue in the polyester, tending to prevent the effect from being obtained. Such fly-off also tends to produce obstruction of the vacuum system. Dialkyl esters of phosphonic acid, which have no hydroxyl groups, have a high tendency to fly off and can therefore undergo release and elution from the polymer during the high-temperature spinning steps such as melting and discharge, and readily form extraneous material that adheres to the nozzle. This is also undesirable because it results in impairment of the long-term spinning stability. A dialkyl phosphonate ester also has no hydroxyl groups directly bonding to the phosphorus. Consequently, it has low ability to inactivate metal compounds, such as the transesterification catalyst and polymerization catalyst, and can undesirably impair the molten stability and color tone of the obtained polymer.

The laminar nanoparticles used for the invention are preferably composed of a metal component and a phosphorus component, in which case the metal and phosphorus contents in the polyester used for the invention preferably satisfy the following inequalities (III) and (IV).

$$10 \leq M \leq 1000 \quad \text{(III)}$$

$$0.8 \leq P/M \leq 2.0 \quad \text{(IV)}$$

(In the inequalities, M represents the millimolar percent of the metal element with respect to the dicarboxylic acid component of the polyester, and P represents the millimolar percent of phosphorus element.)

If the metal content is too low, the amount of laminar nanoparticles functioning as crystal nucleating agents will be insufficient and it will be difficult to obtain an effect of improving the spinning property, thus impeding the effect of improving the physical properties of tire cords and pneumatic tires employing them, or belt-reinforcing fiber materials and belts employing them. If it is too high, on the other hand, they will remain as extraneous material in the fiber and lower the physical properties, thus tending to result in more severe heat degradation of the polymer. If the P/M ratio represented by formula (IV) is too small, the metal compound concentration M will be excessive, and the excessive metal atom component will promote thermal decomposition of the polyester and notably impair the thermostability. If the P/M ratio is too large, on the other hand, the phosphorus compound will be excessive and the excessive phosphorus compound component will inhibit the polyester polymerization reaction, tending to lower the physical properties of the fiber. A more preferred P/M ratio is 0.9-1.8.

The polyester fiber of the invention is characterized by comprising the aforementioned laminar nanoparticles, and more specifically, the polyester polymer composing the polyester fiber is preferably one obtained by the following production method.

For example, the polyester polymer used for the invention may be one obtained by polymerization of terephthalic acid or naphthalene-2,6-dicarboxylic acid, or a functional derivative thereof, under suitable reaction conditions in the presence of a catalyst. Before polymerization of the polyester is complete, one or more appropriate third components may be added for synthesis of the copolymerized polyester.

As appropriate third components there may be mentioned (a) compounds having two ester-forming functional groups, for example, aliphatic dicarboxylic acids such as oxalic acid, succinic acid, adipic acid, sebacic acid and dimer acid; alicyclic dicarboxylic acids such as cyclopropanedicarboxylic acid, cyclobutanedicarboxylic acid and hexahydroterephthalic acid; aromatic dicarboxylic acids such as phthalic acid, isophthalic acid, naphthalene-2,7-dicarboxylic acid and diphenyldicarboxylic acid; carboxylic acids such as diphenyletherdicarboxylic acid, diphenylsulfonedicarboxylic acid, diphenoxyethanedicarboxylic acid and sodium 3,5-dicarboxybenzenesulfonate; oxycarboxylic acids such as glycolic acid, p-oxybenzoic acid and p-oxyethoxybenzoic acid; oxy compounds such as propylene glycol, trimethylene glycol, diethylene glycol, tetramethylene glycol, hexamethylene glycol, neopentylene glycol, p-xylylene glycol, 1,4-cyclohexanedimethanol, bisphenol A, p,p'-diphenoxysulfone-1,4-bis (β-hydroxyethoxy)benzene, 2,2-bis(p-β-hydroxyethoxyphenyl)propane, polyalkylene glycol and p-phenylenebis(dimethylcyclohexane), or functional derivatives thereof; and high polymerization degree compounds derived from the aforementioned carboxylic acids, oxycarboxylic acids and oxy compounds or their functional derivatives, or (b) compounds having one ester-forming functional group, for example, benzoic acid, benzoylbenzoic acid, benzyloxybenzoic acid, methoxypolyalkylene glycol and the like. There may also be used (c) compounds having 3 or more ester-forming functional groups, for example, glycerin, pentaerythritol, trimethylolpropane, tricarballylic acid, trimesic acid, trimellitic acid and the like, in ranges that still allow the polymer to be essentially linear.

The polyester may also contain, of course, various additives such as delustering agents, including titanium dioxide, or heat stabilizers, antifoaming agents, color correctors, flame retardants, antioxidants, ultraviolet absorbers, infrared absorbers, fluorescent whitening agents, plasticizers and shock resistors, or reinforcing agents such as montmorillonite, bentonite, hectorite, lamellar iron oxide, lamellar calcium carbonate, lamellar boehmite or carbon nanotubes.

More specifically, the method for producing a polyester polymer according to the invention may be a method for producing a polyester polymer known in the prior art. The production method involves, first, transesterification of a dialkyl ester of a dicarboxylic acid, such as dimethyl terephthalate (DMT) or naphthalene-2,6-dimethyl carboxylate (NDC), as the acid component, and ethylene glycol as the glycol component. The reaction product is then heated under reduced pressure and the excess diol component is removed while conducting polycondensation. Alternatively, the conventionally known direct polymerization methods allow production by esterification between terephthalic acid (TA) and 2,6-naphthalenedicarboxylic acid as the acid components and ethylene glycol as the diol component.

A metal composed of the aforementioned laminar nanoparticles is efficient as the transesterification catalyst when a method of transesterification is used, but other metals may also be used. Generally speaking, manganese, magnesium, titanium, zinc, aluminum, calcium, cobalt, sodium, lithium and lead compounds may be used. Examples of compounds to be used as catalysts include manganese, magnesium, titanium, zinc, aluminum, calcium, cobalt, sodium, lithium, lead oxides, acetic acid salts, carboxylic acid salts, hydrides, alcoholates, halides, carbonates, sulfuric acid salts and the like.

Manganese, magnesium, zinc, titanium and cobalt compounds are preferred from the viewpoint of polyester molten stability and color tone, low polymer insoluble matter, and spinning stability. Manganese, magnesium and zinc compounds are more preferred. These compounds may also be used in combinations of two or more.

The polymerization catalyst is preferably an antimony, titanium, germanium or aluminum compound. Examples of such compounds include antimony, titanium, germanium and aluminum oxides, acetates, carboxylates, hydrides, alcoholates, halides, carbonates and sulfates. These compounds may also be used in combinations of two or more.

Antimony compounds are particularly preferred among these. Such compounds result in excellent polymerization activity, solid-state polymerization activity, molten stability and color tone of the polyester, and the obtained fiber is of high tenacity with excellent spinning properties and stretchability.

In a method of direct esterification reaction between an aromatic dicarboxylic acid component, such as terephthalic acid and a glycol component, such as ethylene glycol, there is no need for a transesterification catalyst or a catalyst for direct esterification reaction. However, a catalyst component for formation of the laminar nanoparticles must be included to exhibit the effect of the invention. The metal component content in the catalyst is preferably in the range of 10-1000 millimolar percent with respect to the total repeating units of the polyester.

Also according to the invention, the final polyester contains laminar nanoparticles, and the laminar nanoparticles are preferably internally precipitated by addition of a divalent metal and a phosphorus compound to the polyester.

The method for producing polyester fiber according to the invention is preferably one wherein the laminar nanoparticles in the polyester used for the production method of the invention are produced by adding a metal element and a phosphorus compound to the polyester. Internal precipitation of the laminar nanoparticles can further promote microdispersion of the laminar nanoparticles and improve the performance of the obtained fiber, compared to adding laminar nanoparticles externally. A preferred mode is one wherein a polyester master polymer comprising such laminar nanoparticles at a high concentration is prepared beforehand and diluted with a polyester base polymer for use.

More specifically, for a production method involving esterification reaction with a dicarboxylic acid component and a diol component, the divalent metal and phosphorus compound may be added even during the steps from esterification reaction until just prior to spinning, for internal precipitation of the laminar nanoparticles in the polyester.

For a production method involving transesterification reaction with a dialkyl ester of a dicarboxylic acid and a diol component, the divalent metal and phosphorus compound may be added even during the steps from transesterification reaction until just prior to spinning, for internal precipitation of the laminar nanoparticles in the polyester. More preferably, the divalent metal and phosphorus compound are added before completion of the polycondensation. Following polycondensation, the polymer viscosity increases and it becomes difficult to evenly disperse the divalent metal and/or phosphorus compound.

The order of addition of the divalent metal and phosphorus compound may be simultaneous or separate, with either before the other. A preferred method involves adding either one first and using a stirrer for through dispersion, and then adding the other. This method allows control of aggregation of the laminar nanoparticles. Reaction inhibition, described hereunder, is a problem with production methods by transesterification reaction, and therefore care must be taken during addition of the phosphorus compound.

For production of laminar nanoparticles it is preferred to add a phosphorus compound to a polyester having a metal as the catalyst component. The phosphorus compound content in the polyester polymer is preferably within the following range.

$$0.8 \leq P/M \leq 2.0 \quad \text{(IV)}$$

(In the inequality, M represents the millimolar percent of the metal element with respect to the dicarboxylic acid component of the polyester, and P represents the millimolar percent of phosphorus element.)

If the P/M ratio represented by formula (IV) is too small, the metal compound concentration M will be excessive, and the excessive metal atom component will promote thermal decomposition of the polyester and notably impair the thermostability. If the P/M ratio is too large, on the other hand, the phosphorus compound is instead excessive and the excessive phosphorus compound component will inhibit the polyester polymerization reaction, tending to lower the physical properties of the fiber. A more preferred P/M ratio is 0.9-1.8.

There are no particular restrictions on the timing for addition of the phosphorus compound. It may be added in any desired step of the polyester production. Preferably, however, it is added between start of the transesterification reaction or esterification reaction and completion of polymerization. More preferably, it is added after completion of the transesterification reaction or esterification reaction and before completion of the polymerization reaction. Particularly in the case of transesterification, the phosphorus compound is preferably added upon completion of the transesterification reaction. Addition prior to the transesterification reaction may cause inhibition of transesterification by the phosphorus compound, resulting in problems such as reduced productivity and impaired color tone of the obtained polyester polymer.

Alternatively, the method employed may be polyester polymerization followed by kneading of the phosphorus compound using a kneader. There are no particular restrictions on the method of kneading, but usually a uniaxial or biaxial kneader is used. More preferred is a method using a vent-type uniaxial or biaxial kneader, to prevent reduction in the polymerization degree of the obtained polyester composition.

The conditions for kneading are not particularly restricted, and may be, for example, at or above the melting point of the polyester, with a residence time of within 1 hour and more preferably 1-30 minutes. The method of supplying the phosphorus compound and polyester to the kneader is not particularly restricted. For example, it may be a method of supplying the phosphorus compound and polyester separately to the kneader, or a method of supplying master chips comprising the phosphorus compound at high concentration, with appropriate mixing of the polyester.

The polyester polymer used for the invention, that has been polymerized as described above, has a limiting viscosity of the resin chips just prior to spinning, in the range of 0.80-1.20 for polyethylene terephthalate and 0.65-1.2 for polyethylene naphthalate, with melt polymerization or solid-state polymerization by a known method. If the limiting viscosity of the resin chips is too low, it will be difficult to obtain high tenacity for the fiber after melt spinning. If the limiting viscosity is too high, the solid-state polymerization time will be significantly lengthened and the production efficiency will be lowered, which is undesirable from an industrial standpoint. The limiting viscosity is more preferably in the range of 0.9-1.1 for polyethylene terephthalate and 0.7-1.0 for polyethylene naphthalate.

The polyester fiber of the invention can be produced by melt spinning a polyester polymer comprising laminar nanoparticles obtained in the manner described above.

Another method for producing the polyester fiber of the invention is a method for producing a polyester fiber by melt spinning a polyester comprising laminar nanoparticles, it being an essential condition that the laminar nanoparticles are composed of a divalent metal and a phosphorus compound, and have shapes with a side length of 5-100 nm and an interlayer spacing of 1-5 nm. The laminar nanoparticles are preferably generated by external addition of the divalent metal and phosphorus compound during the production process.

More specifically, the method for producing a polyester fiber according to the invention may be melting of the obtained polyester polymer at a temperature of 285-335° C. and spinning using a capillary spinneret. Preferably, it is passed through a hot spinning chimney at above the molten polymer temperature, immediately after discharge from the spinneret. The length of the hot spinning chimney is preferably 10-500 mm. Since the polymer immediately after discharge from the spinneret tends to be easily oriented and prone to monofilament cuts, a hot spinning chimney is preferred to delay cooling.

The spun yarn that has passed through the hot spinning chimney is then preferably cooled by blowing cool air at below 30° C. Cool air at below 25° C. is more preferably used. Preferably, a lubricant is then applied to the cooled filament.

When the molten polymer composition is discharged from the spinneret in this manner for molding, the spinning speed is preferably 300-6000 m/min. The method of molding in the production method of the invention is preferably spinning followed by drawing, from the viewpoint of accomplishing high efficiency production.

The polyester fiber of the invention is most preferably spun at high temperature, and the spinning speed is preferably 1500-5500 m/min. The fiber obtained before drawing is a partially oriented yarn. With high-speed spinning and high orientation and crystallization of the fiber in the prior art, yarn breakage has usually occurred during the spinning stage. According to the invention, however, the effect of the laminar nanoparticles dispersed in the polymer presumably allows uniform orientation and crystallization and reduces spinning defects. As a result of the drastically improved spinning property, it is possible to exhibit notably excellent mechanical properties, durability and dimensional stability, as a tire cord or a pneumatic tire employing it, or as a belt-reinforcing fiber material or a belt employing it.

The drawing conditions are preferably drawing to a factor of 1.5-10 after spinning. Drawing after spinning can produce even higher strength drawn filaments. Conventionally, sections of low strength due to crystal defects are present during drawing, even with spinning to a low factor, and therefore yarn breakage has been a common problem. According to the invention, however, microcrystals are homogeneously formed during the crystallization by drawing due to the presence of the laminar nano compounds, such that drawing defects are inhibited. As a result, drawing can be accomplished to a high factor, allowing high-tenacity fiber to be obtained.

The drawing method used to obtain the polyester fiber of the invention may be drawing by "separated drawing" after the fiber has been wound on a take-up roller. Alternatively, drawing may be accomplished by "direct drawing" wherein the undrawn filament is supplied continuously to the drawing step from the take-up roller. The drawing conditions may be single-stage or multi-stage drawing, and the drawing load rate is preferably 60-95%. The drawing load rate is the ratio of the tensile force during drawing with respect to the tensile force at which the yarn breaks.

The preheating temperature for drawing is preferably a temperature of no lower than 20° C. below the glass transition point of the polyester undrawn filament and a temperature of no higher than 20° C. below the crystallization start temperature. The draw ratio will depend on the spinning speed, but preferably drawing is carried out at a draw ratio for a drawing load rate of 60-95% with respect to the breaking draw ratio. In order to maintain the fiber tenacity and also improve the dimensional stability, heat setting is preferably carried out during the drawing step at a temperature of at least 170° C. and no higher than the melting point of the fiber. The heat setting temperature during drawing is preferably in the range of 170-270° C.

In the production method of the invention, the crystallinity of the polymer composition is improved because the polyester polymer comprises the special laminar nanoparticles of the invention. Numerous microcrystals are formed in the stages of melting and discharge from the spinneret. The microcrystals inhibit coarse crystal growth during the spinning and drawing steps, and aid microdispersion of the crystals. It is believed that microdispersion of the crystals drastically reduces the breakage rate during each step, resulting in improved physical properties of the finally obtained polyester fiber.

The method for producing polyester fiber according to the invention is preferably one wherein the laminar nanoparticles in the polyester used for the production method of the invention are produced by external addition of a metal element and a phosphorus compound during the polyester production process. Internal precipitation of the laminar nanoparticles can further promote microdispersion of the laminar nanoparticles and improve the performance of the obtained fiber, compared to adding laminar nanoparticles externally. A preferred mode is one wherein a polyester master polymer comprising such laminar nanoparticles at a high concentration is prepared beforehand and diluted with a polyester base polymer for use.

Various modifications have been implemented in the prior art to accomplish high-speed spinning of polyester fiber, but addition of the special laminar nanoparticles of the invention drastically increases the spinning stability to permit high-speed spinning. Since yarn breakage is inhibited, it is possible to increase the practical draw ratio and obtain polyester fiber of higher tenacity.

The polyester fiber of the invention has a low limiting viscosity IVf and extremely high spinning speed for yarn breakage. It also has high tenacity, low stretch load (high modulus) and low variation in its properties of high elasticity, while it has low dry shrinkage and yet exhibits low fluff defects and a satisfactory spinning property.

The mechanism by which the effect of the invention is exhibited has not been completely elucidated, but it is believed that the presence of the fine laminar nanoparticles and dispersion of the fine particles reinforces the polyester polymer, or prevents concentration of stress at defects, thus reducing structural defects in the fiber. The polyester fiber of the invention also preferably has the laminar nanoparticles specifically oriented parallel to the fiber axis. It is believed that this results in the effects of regular orientation of the polymer molecules, improved breakage spinning speed, reduced fluff defects, an improved spinning property and lower variation in physical properties.

The tenacity of the polyester fiber of the invention, obtained by the production method described above, is preferably 4.0-10.0 cN/dtex. It is more preferably 5.0-9.5 cN/dtex. The durability is impaired not only if the tenacity is too low but also if it is too high. Also, production with barely sufficient tenacity can cause yarn breakage during the spinning step, causing problems of quality stability for industrial fiber.

The hot air shrinkage rate at 180° C. is preferably 1-15%. If the hot air shrinkage rate is too high, the dimensional change during working will tend to be excessive, and the dimensional stability of molded articles obtained using the fiber will tend to be inferior.

There are no particular restrictions on the monofilament size of the obtained polyester fiber, but from the viewpoint of the spinning property it is preferably 0.1-100 dtex/filament. It is preferably 1-20 dtex/filament for rubber-reinforcing fiber in tire cords, V-belts and the like, or industrial material fiber, from the viewpoint of strength, heat resistance and adhesion.

The total denier is not particularly restricted but is preferably 10-10,000 dtex. It is preferably 250-6,000 dtex for rubber-reinforcing fiber in tire cords, V-belts and the like, or industrial material fiber. Doubling of 2-10 yarn is preferred during the spinning and drawing, or after their completion, so that the total denier is, for example, 2,000 dtex when two 1,000 dtex filaments are doubled.

The polyester fiber of the invention preferably has the form of a cord, where the polyester fiber is provided as a multifilament and twisted. Twisting of multifilament fiber can equalize the strength utilization factor and improve fatigability. The number of twists is preferably in the range of 50-1000 turn/m. The cord is preferably doubled with first twisting and final twisting. The number of filaments composing the yarn before doubling is preferably 50-3000 filaments. Forming such a multifilament further improves the fatigue resistance or softness. The tenacity will tend to be insufficient if the size is too small. If the size is too large, on the other hand, the excessive thickness may interfere with softness, or agglutination may tend to occur between filaments during spinning, hampering stable production of the fiber.

A desired fiber cord can be obtained by further twisting or doubling of the obtained fiber in the method for producing polyester fiber according to the invention. It is also preferred to apply an adhesive treatment agent onto the surface. Treatment with an RFL adhesive treatment agent is optimal for rubber reinforcement.

More specifically, a fiber cord can be obtained by applying an RFL treatment agent to the twisted or non-twisted polyester fiber by a common method, and performing heat treatment, and such fiber can serve as a treated cord suitable for rubber reinforcement.

The tire cord of the invention is a tire cord composed of fiber comprising polyester fiber obtained by the production method described above.

The tire cord of the invention preferably has the form of a cord obtained by spinning polyester fiber into a multifilament and twisting it. Twisting of multifilament fiber can equalize the strength utilization factor and improve fatigability. The number of twists in the spun polyester fiber is preferably in the range of 200-800 turn/m, and preferably first twisting and final twisting are combined for doubling as a cord. The number of filaments composing the polyester fiber yarn before doubling is preferably 50-3000. Forming such a multifilament improves the fatigue resistance or softness. The strength will tend to be insufficient if the size is too small. If the size is too large, on the other hand, the excessive thickness may interfere with softness, or agglutination may tend to occur between filaments during spinning, hampering stable production of the fiber.

The tire cord of the invention is preferably used in a tire, by forming a tire fabric from the cord. In this case, the cord composed of the first-twisted and final-twisted polyester fiber is used as warp yarn at 1000-1500 strands, and is woven with weft yarn without separation of the warp yarn, to obtain a tire fabric. The preferred width of the tire fabric is 140-160 cm, the preferred length is 800-2500 m, and preferably the weft yarn is implanted at a 2.0-5.0/5 cm spacing.

The weft yarn used for weaving of a screen is preferably spun yarn such as cotton or rayon, or synthetic fiber yarn, as examples of yarn types known in the prior art, among which fine spun doubled yarn with polyester fiber and cotton is preferred.

An adhesive is preferably included in the polyester cord or tire fabric comprising it, for bonding between the rubber of the tire and the polyester cord. The added adhesive may be an adhesive containing an epoxy compound, isocyanate compound, halogenated phenol compound, resorcin-polysulfide compound, or the like. More specifically, and most preferably, a mixture of an epoxy compound, a block isocyanate and a latex is applied as the first treatment solution, and after heat treatment, a solution comprising a precondensate of resorcin and formaldehyde and a rubber latex (RFL solution) is applied as the second treatment solution, and the application is followed by further heat treatment. For example, the adhesive-applied polyester cord or tire fabric may be subjected to drying at 80-180° C. for 30-150 seconds, followed by tension or relaxation heat treatment for 30-150 seconds at 200-250° C. and preferably 210-240° C. Stretching is preferably carried out to 2%-10%, and more preferably 3%-9%, during this time.

The tire cord or tire fabric composed of the obtained polyester fiber may be used to obtain a pneumatic tire, as another mode of the invention. This may be, for example, a pneumatic tire wherein the tire cord is used as either or both the belt and carcass ply situated inside the tread of the pneumatic tire. Such a tire can be produced by a known method, and by providing a belt and/or carcass ply comprising the tire cord of the invention inside the tread section, the tire becomes effectively reinforced by fiber.

The tire of the invention exhibits excellent uniformity, running stability and durability. The tire is a high-performance pneumatic tire that is light with rolling resistance and excellent maneuvering stability.

The belt-reinforcing fiber material of the invention is preferably a twisted fiber cord. For example, the polyester fiber is preferably provided as a multifilament and twisted for use as a cord. Twisting of multifilament fiber equalizes the strength utilization factor and improves fatigability. The number of twists is preferably in the range of 50-1000 turn/m, and the twist constant is preferably such that $K=T \cdot D^{1/2}$ (where T is the number of twists per 10 cm and D is the fineness of the twisted cord) is 990-2,500.

The cord is preferably doubled by first twisting and final twisting, and the number of filaments composing the yarn before doubling is preferably 50-3000. Forming such a multifilament improves the fatigue resistance or softness. However, the tenacity will tend to be insufficient if the size is too small. If the size is too large, on the other hand, the excessive thickness may interfere with softness, or agglutination may tend to occur between filaments during spinning, hampering stable production of the fiber.

The belt-reinforcing fiber material of the invention is preferably a woven fabric, with the warp yarn composing the woven fabric being yarn composed of polyester fiber. The yarn used may be in the form of the fiber cord described above.

When used as a woven fabric, preferably the polyester fiber is twisted and used in a bundle of 1000-1500 as warp yarn, with non-twisted filaments of synthetic fiber such as polyamide fiber, polyester fiber or polyvinyl alcohol fiber, or twisted yarn with a twist constant of no greater than 5000, as the weft yarn, to prepare a woven belt-reinforcing fiber material.

There are no particular restrictions on the woven texture of the woven fabric used as the belt-reinforcing fiber material. However, a twill texture or satin texture is particularly preferred, to increase the force during constant stretching and generate high tensile force with low stretching when used as a belt base fabric while also reducing noise during belt running, and is suitable for belts such as conveyor belts.

The fiber cord or woven fabric serving as the belt-reinforcing fiber material also preferably has an adhesive applied on the surface. For example, treatment with an RFL-based adhesive treatment agent is optimal for rubber reinforcement.

The belt-reinforcing fiber material of the invention described above has superior heat resistance and dimensional stability compared to conventional polyester fiber, and therefore has very high moldability in complex. The effect is particularly notable when rubber is used as the matrix, and for use as a belt such as a V-belt, conveyor belt or the like.

The belt-reinforcing fiber material of the invention is a belt-reinforcing fiber material composed of fiber comprising polyester fiber obtained by the production method described above.

The belt-reinforcing fiber material of the invention is used as a fiber cord by twisting and doubling of the polyester fiber, for example. The fiber cord may be used as warp yarn to form a base fabric, for example, for use as a reinforcing fiber structure. It is also preferred to apply an adhesive treatment agent onto the surface of the fiber structure. An RFL adhesive treatment agent is optimal as the adhesive treatment agent for rubber reinforcement.

More specifically, a fiber cord can be obtained by applying an RFL treatment agent to the twisted or non-twisted polyester fiber by a common method, and performing heat treatment, and such fiber can serve as a treated cord suitable for rubber reinforcement. That is, the polyester fiber is doubled and twisted with a twist constant $K=T \cdot D^{1/2}$ (where T is the number of twists per 10 cm and D is the fineness of the twisted cord) of 990-2,500 to form a twisted cord, and the cord is treated at 230-270° C. after the adhesive treatment.

Figure 3:
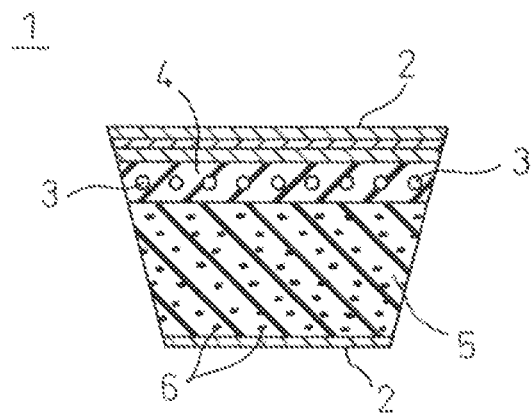
FIG. 3 is a cross-sectional view showing an embodiment of a belt employing a cord of the invention as the core.
Figure 4:
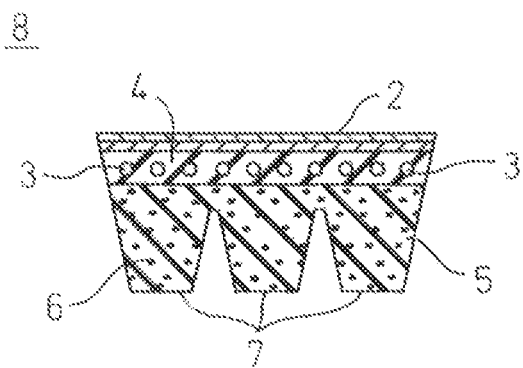
FIG. 4 is a cross-sectional view showing an example of a belt employing a cord of the invention as the core.
Figure 5:
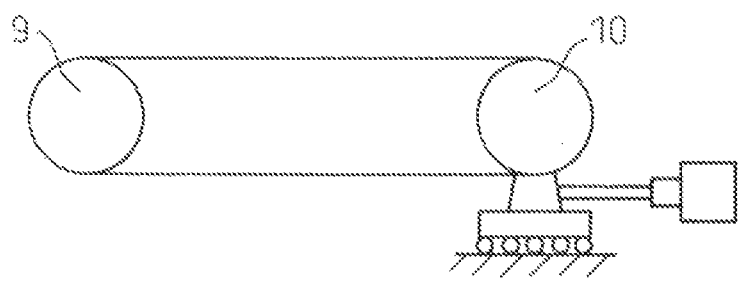
FIG. 5 is a schematic diagram showing a method of measuring the belt tension maintenance factor.

The fiber cord serving as the belt-reinforcing fiber material of the invention may be optimally used as the core of a power transmission belt such as a V-belt, wrapped belt or ribbed belt. FIG. 3 and FIG. 4 show typical examples of use. FIG. 3 shows a longitudinal section diagram of the obtained V-belt 1. The V-belt may be a belt of a type wherein a rubber-attached cloth 2 woven in a natural fiber or synthetic fiber system is present only on the upper surface or lower surface of the belt. The core 3 composed of the fiber cord of the invention is embedded in the adhesive rubber layer 4 adjacent to the compressed rubber layer 5. Staple fibers 6 are mixed in the compressed rubber layer 5 in the cross-machine direction of the belt.

Examples of using the fiber cord of the invention are not limited to a V-belt of the type shown in FIG. 3, as it may be used as the core of a wrapped-type V-belt wherein a rubber-attached cloth 2 covers the entire periphery, or it may be used as the core of a V-ribbed belt 8 having a plurality of ribs 7 in the compressed rubber layer 5 in the lengthwise direction of the belt, as shown in FIG. 4.

The belt-reinforcing fiber material of the invention may also be a woven fabric. In this case, the polyester fiber may be twisted and used in a bundle of 1000-1500 as warp yarn, with non-twisted filaments of synthetic fiber such as polyamide fiber, polyester fiber or polyvinyl alcohol fiber, or twisted yarn with a twist constant of no greater than 5000, as the weft yarn, for weaving to prepare a reinforcing base fabric as a belt-reinforcing fiber material. The woven texture is preferably a twill texture or satin texture. A twill texture or satin texture is preferred to increase the force during constant stretching and to generate high tensile force with low stretching when used as a belt base fabric, and is suitable for belts such as conveyor belts.

The belt-reinforcing fiber material of the invention obtained in this manner may be used together with a polymer to form a belt as a fiber/polymer complex. The polymer is preferably a rubber elastomer. Since the polyester fiber used for reinforcement in the complex has excellent heat resistance and dimensional stability, the moldability as a complex is extremely high. It is particularly optimal for rubber reinforcement, and can be suitably used in a V-belt or conveyor belt, for example.

EXAMPLES

The invention will now be explained in more specific detail through the following examples, with the understanding that the scope of the invention is not limited by the examples. The properties were measured by the following methods.
(1) Intrinsic Viscosity:
A dilute solution comprising polyester chips and polyester fiber dissolved in orthochlorophenol at 100° C. over a period of 60 minutes was measured using a Ubbelohde viscometer at 35° C. and the value was recorded. It was denoted as IV.

(2) Diethyleneglycol Content:
Hydrazine hydrate was used to dissolve polyester composition chips, and the diethylene glycol content of the decomposition product was measured by gas chromatography (Model HP6850 by Hewlett Packard).
(3) Measurement of Phosphorus and Metal Atom Contents
The content of each metal element was measured by dissolving a sample in orthochlorophenol and performing extraction with 0.5N hydrochloric acid. Basically, the extract was quantified using a Model Z-8100 atomic absorption photometer by Hitachi, Ltd.

The contents of phosphorus and the elements antimony, manganese, cobalt and zinc, for which atomic absorption is not suited, were determined by quantitative analysis using a fluorescent X-ray apparatus (Model 3270E by Rigaku Corp.). For fluorescent X-ray measurement, a sample of the polyester resin polymer as chips or fiber was heated to 260° C. for 2 minutes using a compression press under pressurized conditions of 7 MPa to form a test compact with a flat surface, for measurement.
(4) X-Ray Diffraction
The polyester composition/fiber was subjected to X-ray diffraction measurement using an X-ray diffraction apparatus (RINT-TTR3 by Rigaku Corp., Cu-Kα-rays, tube voltage: 50 kV, current: 300 mA, parallel beam method). The interlayer distance d (angstroms) between the laminar nanoparticles was calculated using a 2θ-d conversion table, from the diffraction peak appearing in the equatorial direction at 2θ=2-7°.
(5) Analysis of Laminar Nanoparticles
Confirmation of the laminar nanoparticles and constituent elements was accomplished by preparing an ultrathin strip of the polyester resin/fiber with a thickness of 50-100 nm by a common method, observing it using a transmission electron microscope (TECNAI G2 by FEI Corp.) at an acceleration voltage of 120 kV, and performing elemental analysis using a transmission electron microscope (JEM-2010 by JEOL Corp.) at an acceleration voltage of 100 kV and a probe diameter of 10 nm. The length of a particle section was determined from the obtained image.
(6) Fiber Tenacity, Elongation and Elongation at Specific Load (EASL)
A tensile load meter (Autograph by Shimadzu Corp.) was used for measurement according to JIS L-1013. The elongation at specific load was represented as the elongation at a stress of 4 cN/dtex. For calculation of variation, the average value of 50 measured points was determined and the standard deviation σ representing the variation in the physical property was calculated.
(7) Hot Air Shrinkage Rate (Dry Shrinkage) of Fiber
A sample was allowed to stand in a temperature/humidity controlled room at 20° C., 65% RH for 24 hours, according to JIS-L1013. It was then subjected to heat treatment at 180° C.×30 min in a drier, in a no-load state, and the difference in sample length before and after the heat treatment was calculated.
(8) Fluff Defects in Product
Filament cuts found in outer examination of the wound fiber product were evaluated as follows, as fluff defects.
⊚: Highly satisfactory with no fluff defects.
◯: Satisfactory with few fluff defects.
Δ: Some fluff with relatively high product loss.
X: Significant product loss due to notable fluff.
(9) Spinning Property
Evaluation was performed based on the number of yarn breaks per ton of wound fiber product.
⊚: At least 0 and less than 0.5/ton
◯: At least 0.5 and less than 1.0/ton Δ: At least 1.0 and less than 3.0/ton
X: At least 3.0/ton

(10) Fiber Breaking Elongation and 150° C. Hot Air Shrinkage Rate (150° C. Dry Shrinkage)

This was measured according to JIS L-1013.

(11) Cord Tenacity, Breaking Elongation, Elongation at Specific Load (EASL) and 150° C. Hot Air Shrinkage Factor (150° C. Dry Shrinkage)

This was measured according to JIS-L1017. The elongation at specific load was determined as the elongation with stress of 66N or 118N. These are denoted as "66N EASL" and "118N EASL", respectively.

(12) Tire Uniformity

The RFV (Lateral Force Variation) of a test tire was measured according to JASOC607 (Automobile Tire Uniformity Test Method), under conditions of rim (16×6.5 JJ), internal pressure (200 kPa) and load (5.50 kN), and was evaluated relative to 100 as the index for the tire of Comparative Example 1. A smaller numerical value indicates more excellent uniformity.

(13) Maneuvering Stability

A test tire was mounted on an automobile and run on a loop course at a speed of 180 km/h or greater, and the degree of disturbance convergence was evaluated by the feel of the test driver when disturbance was felt, and recorded relative to 100 as the index for the tire of Comparative Example 1. A larger index is more satisfactory.

(14) Durability (Drum Test)

The cord strength retention was recorded and compared before and after drum running for 50,000 km under conditions with a tire internal pressure of 3.0 kg/cm$^2$, a load of 990 kg and a speed of 60 km/h. A larger numerical value indicates more excellent high-speed durability.

(16) Tire Rolling Resistance Property

The rolling resistance was measured with running at 23° C., 80 km/h using a uniaxial drum tester for rolling resistance measurement, under conditions of rim (16×6.5 JJ), internal pressure (200 kPa) and load (5.50 kN). The index was recorded relative to 100 as the value of Comparative Example 1. A smaller index indicates lower rolling resistance, and therefore more excellent fuel efficiency.

(17) V-Belt Tensile Strength Maintenance Factor

A V-belt was installed between pulleys 9, 10 with diameters of 100 mm, as shown in FIG. 3, and a running test was performed at room temperature with an initial mounted tensile force of 900 N and a running pulley rotational speed of 3600 r.p.m. Running was suspended after 4 hours, and after another 24 hours of standing, the belt tension was measured and the tensile strength maintenance factor with respect to the initial mounting tensile force was also measured.

(18) V-Belt Dimensional Change Rate

The difference between the belt outer periphery length immediately after curing and the V-belt outer periphery length after 30 days was divided by the belt outer periphery length immediately after curing, to calculate the belt dimensional change rate.

(19) V-Belt Fatigue Resistance

The core was removed from the belt after the V-belt running test of (17) above, the force was measured, and the strength maintenance factor with respect to the force of the core removed for the belt prior to the belt running test was calculated.

(20) Woven Fabric Breaking Strength

The breaking strength in the warp yarn direction of the woven fabric was measured according to JIS L 1096. The forces under 1% and 3% tension during measurement of the breaking strength of the woven fabric were recorded as the 1% and 3% tension strengths, respectively.

(21) Dimensional Change Rate of Base Fabric-Reinforced Belt

The difference between the belt outer periphery length immediately after curing and the belt outer periphery length after 30 days was divided by the belt outer periphery length immediately after curing, to calculate the belt dimensional change rate.

(22) Fatigue Resistance of Reinforcing Base Fabric

The reinforcing base fabric was removed from the belt after a belt running test in which the belt was wrapped around a 30 mm-diameter driving pulley and a 30 mm-diameter driven pulley at a tensile force of 6 N/mm and run for 4 hours at a speed of 470 m/min, and then the strength was measured and the strength maintenance factor was calculated with respect to the strength of the reinforcing base fabric removed from the belt before the belt running test.

Example 1

Production of Polyester Composition Chips

A mixture of 194.2 parts by weight of dimethyl terephthalate and 124.2 parts by weight of ethylene glycol (200 mol % to DMT), and 0.0735 part by weight of manganese acetate tetrahydrate (30 mmol % to DMT), were charged into a reactor equipped with a stirrer, rectification column and methanol distillation condenser. The temperature was then slowly raised from 140° C. to 240° C. while distilling out of the reactor the methanol that was generated by the reaction, to accomplish transesterification. After then adding 0.0522 part by weight of phenylphosphonic acid (33 mmol % to DMT), the transesterification reaction was suspended. There was then added 0.0964 part by weight of antimony trioxide (33 mmol % to DMT) to the reaction product, and the mixture was transferred to a reactor equipped with a stirrer, nitrogen inlet, pressure reduction valve and distilling apparatus. The temperature was subsequently raised to 290° C. for polycondensation reaction at a high vacuum of below 30 Pa, to obtain a polyester composition. Chips were then prepared by a common method.

The obtained polyester chips were observed with a transmission electron microscope, and they contained laminar nanoparticles with lengths of 20 nm and an interlayer distance of 1.5 nm. The results are shown in Table 1.

Production of Polyester Fiber

The obtained polyester chips were dried under a nitrogen atmosphere at 160° C. for 3 hours, for pre-crystallization. Solid-state polymerization reaction was conducted in a vacuum at 230° C. The limiting viscosity of the obtained polyethylene terephthalate composition chips was 1.02.

These were used for spinning from a spinneret having 250 openings with an aperture diameter of 1.0 mm, at a polymer melting temperature of 296° C. The spun yarn was passed through a cylindrical heating zone heated to 300° C., which had a length of 200 mm and was provided directly below the nozzle. Cooling air at 20° C., 65% RH was then blown onto the spun yarn through a cylindrical chimney with a blowing distance of 500 mm, for cooling. A lubricant composed mainly of an aliphatic ester compound was also applied to a lubricant coverage of 0.5% on the fiber. It was then taken up onto a roller with a surface temperature of 50° C., at a speed of 2500 m/min.

In order to measure the breakage spinning speed of the yarn, the take-up roller speed was gradually increased and the speed at which breakage of the spun yarn occurred was recorded.

The spun discharged yarn was immediately subjected to first-stage drawing to a factor of 1.4 between first rollers with a surface temperature of 60° C., without being taken up, at a speed of 2500 m/min. It was then subjected to second-stage drawing to a factor of 1.15 between the first roller and a second roller with a surface temperature of 75° C., and subsequently to third-stage drawing to a factor of 1.4 between a third roller with a surface temperature of 190° C. The running yarn was wound around the third roller at this time, and heat set at 190° C. for 0.2 second. It was finally taken up at a constant length onto a cooling roller, and wound up at a take-up speed of 5000 m/min to obtain polyester fiber.

The obtained polyester fiber was observed with a transmission electron microscope, and it contained laminar nanoparticles with lengths of 20 nm, an interlayer distance of 1.5 nm, and an average of 11 layers. No ordinary particulate metal-containing particles were observed. Transmission microscope and X-ray diffraction observation were performed to confirm that the laminar nanoparticles were oriented parallel to the fiber axis. The limiting viscosity IVf reduction of the obtained fiber was low, and the spinning speed for yarn breakage was very high. The fiber also had low variation in its properties of high tenacity, low stretch load (high modulus) and high elasticity. Moreover, despite the low dry shrinkage of the fiber, it had few fluff defects and a satisfactory spinning property. The physical properties and processability of the fiber are shown in Table 2.

Examples 2-8

A polyester polymer was obtained in the same manner as Example 1, except that the compound types and amounts were changed to those shown in Table 1, instead of the manganese acetate tetrahydrate and phenylphosphonic acid of Example 1. The results are summarized in Table 1.

Melt spinning and drawing were carried out in the same manner as Example 1 to obtain polyester fiber. The obtained fiber contained laminar nanoparticles, and no ordinary particulate metal-containing particles were observed.

Also, the limiting viscosity IVf reduction of the obtained fiber was low and the spinning speed for yarn breakage was very high. The fiber also had low variation in its properties of high tenacity, low stretch load (high modulus) and high elasticity. Moreover, despite the low dry shrinkage of the fiber, it had few fluff defects and a satisfactory spinning property. Particularly when phenylphosphonic acid was used, a satisfactory effect was exhibited even with a low content. The results are summarized in Table 2.

Example 9

After supplying a slurry comprising 166.13 parts by weight of terephthalic acid and 74.4 parts by weight of ethylene glycol into a polycondensation tank, esterification reaction was conducted at ordinary pressure, 250° C. to prepare bis(β-hydroxyethyl)terephthalate and its low polymers, at an esterification reaction rate of 95%. Next, 0.0735 part by weight of manganese acetate tetrahydrate (30 mmol % to TA) was added, and after stirring for 5 minutes, 0.0522 part by weight of phenylphosphonic acid (33 mmol % to TA) and 0.0964 part by weight of antimony trioxide (33 mmol % to TA) were added and the mixture was transferred to a reactor equipped with a stirrer, nitrogen inlet, pressure reduction valve and distilling apparatus. The temperature of the reactor was raised to 290° C. for polycondensation reaction at a high vacuum of below 30 Pa, to obtain a polyester composition. Chips were then prepared by a common method. The results are summarized in Table 1.

Melt spinning and drawing were carried out in the same manner as Example 1 to obtain polyester fiber. The obtained fiber contained laminar nanoparticles, and no ordinary particulate metal-containing particles were observed. Also, the limiting viscosity IVf reduction of the obtained fiber was low and the spinning speed for yarn breakage was very high. The fiber also had low variation in its properties of high tenacity, low stretch load (high modulus) and high elasticity. Moreover, despite the low dry shrinkage of the fiber, it has few fluff defects and a satisfactory spinning property. The results are summarized in Table 2.

Comparative Examples 1-8

A polyester polymer was obtained in the same manner as Example 1, except that the compound types and amounts were changed to those shown in Table 1, instead of the manganese acetate tetrahydrate and phenylphosphonic acid of Example 1. Observation with an electron microscope revealed no laminar nanoparticles, and even where particles were present they had ordinary spherical shapes. The results are summarized in Table 1.

Melt spinning and drawing were carried out in the same manner as Example 1 to obtain polyester fiber. The results are summarized in Table 2.

Comparative Example 9

A polyester polymer was obtained in the same manner as Example 9, except that no manganese acetate tetrahydrate or phenylphosphonic acid was added. Observation with an electron microscope revealed no laminar nanoparticles. The results are summarized in Table 1.

Melt spinning and drawing were carried out in the same manner as Example 1 to obtain polyester fiber. The results are summarized in Table 2.

Comparative Example 10

A polyester polymer was obtained in the same manner as Example 9, except that the compound types and amounts were changed to those shown in Table 1, instead of the manganese acetate tetrahydrate and phenylphosphonic acid of Example 9. Observation with an electron microscope revealed no laminar nanoparticles. The results are summarized in Table 1.

Melt spinning and drawing were carried out in the same manner as Example 1 to obtain polyester fiber. The results are summarized in Table 2.

Comparative Example 11

A mixture of 194.2 parts by weight of dimethyl terephthalate and 124.2 parts by weight of ethylene glycol (200 mol % to DMT), and 0.0735 part by weight of manganese acetate tetrahydrate (30 mmol % to DMT), were charged into a reactor equipped with a stirrer, rectification column and methanol distillation condenser. The temperature was then slowly raised from 140° C. to 240° C. while distilling out of the reactor the methanol that was generated by the reaction, to accomplish transesterification. After then adding 0.0304 part by weight of orthophosphoric acid (31 mmol % to DMT), the transesterification reaction was suspended. To the reaction product there was added an ethylene glycol solution containing a laminar silicate montmorillonite: KUNIPIA F, product of Kunimune Industries Co., Ltd.), so that the content of the laminar silicate was 1 part by weight with respect to the polyester composition, and then 0.0964 part by weight of antimony trioxide (33 mmol % to DMT) was added and the mixture was transferred to a reactor equipped with a stirrer, nitrogen inlet, pressure reduction valve and distilling apparatus. The temperature was subsequently raised to 290° C. for polycondensation reaction at a high vacuum of below 30 Pa, to obtain a polyester composition. Chips were then prepared by a common method.

Observation of the obtained polyester chips with a transmission electron microscope revealed aggregates of montmorillonite which contained laminar particles (laminar silicate) with lengths of 150 nm and an interlayer distance of 1.3 nm, but some had side lengths of 1 μm or longer. The results are shown in Table 1.

Melt spinning and drawing were carried out in the same manner as Example 1 to obtain polyester fiber. The results are summarized in Table 2.

TABLE 1

| No. | Metal compound M/Phosphorus compound P | Content M/P mmol %/mmol % | P/M ratio | IV dL/g | DEG wt % | Particle shape | Particle size nm | Interlayer distance nm |
|---|---|---|---|---|---|---|---|---|
| Example 1 | Manganese acetate/phenylphosphonic acid | 30/30 | 1.0 | 0.63 | 0.6 | laminar | 20 | 1.5 |
| Example 2 | Cobalt acetate/phenylphosphonic acid | 30/30 | 1.0 | 0.63 | 0.6 | laminar | 8 | 1.6 |
| Example 3 | Zinc acetate/phenylphosphonic acid | 30/30 | 1.0 | 0.63 | 0.6 | laminar | 11 | 1.6 |
| Example 4 | Magnesium acetate/phenylphosphonic acid | 70/140 | 2.0 | 0.63 | 0.6 | laminar | 67 | 1.5 |
| Example 5 | Manganese acetate/phenylphosphonic acid | 20/40 | 2.0 | 0.63 | 0.6 | laminar | 14 | 1.5 |
| Example 6 | Manganese acetate/phenylphosphonic acid | 600/1000 | 1.7 | 0.63 | 1.2 | laminar | 88 | 1.5 |
| Example 7 | Manganese acetate/phenylphosphonic acid | 30/60 | 2.0 | 0.63 | 0.6 | laminar | 18 | 1.6 |
| Example 8 | Manganese acetate/naphthylphosphonic acid | 30/45 | 1.5 | 0.63 | 0.6 | laminar | 45 | 2.1 |
| Example 9 | Manganese acetate/phenylphosphonic acid | 30/30 | 1.0 | 0.63 | 0.9 | laminar | 18 | 1.6 |
| Comp. Ex. 1 | Lithium chloride/dimethylmethylphosphonic acid | 450/400 | 0.9 | 0.63 | 0.7 | globular | 500 | — |
| Comp. Ex. 2 | Calcium acetate/phenylphosphonic acid | 70/140 | 2.0 | 0.63 | 0.7 | globular | 430 | — |
| Comp. Ex. 3 | Sodium acetate/phenylphosphonic acid | 1000/60 | 0.1 | 0.63 | 0.8 | — | — | — |
| Comp. Ex. 4 | Titanium tetra-N-butoxide/phenylphosphonic acid | 30/30 | 1.0 | 0.63 | 1.0 | globular | 250 | — |
| Comp. Ex. 5 | Magnesium acetate/phenylphosphonic acid dimethyl ester | 30/30 | 1.0 | 0.63 | 0.6 | globular | 600 | — |
| Comp. Ex. 6 | Manganese acetate/phosphorous acid | 30/60 | 2.0 | 0.63 | 0.6 | globular | 800 | — |
| Comp. Ex. 7 | Manganese acetate/phosphoric acid | 30/60 | 2.0 | 0.63 | 0.6 | globular | 850 | — |
| Comp. Ex. 8 | Manganese acetate/triethylphosphonoacetate | 30/60 | 2.0 | 0.63 | 0.6 | globular | 450 | — |
| Comp. Ex. 9 | Antimony oxide/phenylphosphonic acid | 30/60 | 2.0 | 0.63 | 0.9 | — | — | — |
| Comp. Ex. 10 | Lithium acetate/phenylphosphonic acid | 30/60 | 2.0 | 0.63 | 0.7 | globular | 235 | — |
| Comp. Ex. 11 | Manganese acetate/phosphoric acid | 30/30 | 1.0 | 0.63 | 0.6 | laminar | 150 | 1.3 |

TABLE 2

| No. | IVF dL/g | Breakage spinning speed m/min | Tenacity cN/dtex | S.D. | Elongation % | S.D. | Elongation at specific load % | S.D. | Hot air shrinkage % | Fluff defects | Spinning property |
|---|---|---|---|---|---|---|---|---|---|---|---|
| Example 1 | 0.91 | 5400 | 7.2 | 0.01 | 13.0 | 0.47 | 6.0 | 0.06 | 11.2 | ⊚ | ⊚ |
| Example 2 | 0.90 | 5150 | 7.3 | 0.01 | 12.2 | 0.39 | 5.9 | 0.06 | 10.5 | ⊚ | ⊚ |
| Example 3 | 0.92 | 5250 | 7.3 | 0.01 | 12.7 | 0.43 | 6.0 | 0.07 | 10.8 | ⊚ | ⊚ |
| Example 4 | 0.91 | 5300 | 7.1 | 0.01 | 12.8 | 0.52 | 6.0 | 0.07 | 11.2 | ○ | ⊚ |
| Example 5 | 0.91 | 5450 | 7.1 | 0.01 | 12.7 | 0.36 | 5.9 | 0.06 | 11.3 | ⊚ | ⊚ |
| Example 6 | 0.89 | 5300 | 7.1 | 0.01 | 13.2 | 0.45 | 6.1 | 0.06 | 10.8 | ○ | ⊚ |
| Example 7 | 0.91 | 5350 | 7.2 | 0.01 | 13.0 | 0.48 | 5.9 | 0.06 | 11.0 | ○ | ○ |
| Example 8 | 0.92 | 5200 | 7.3 | 0.01 | 12.5 | 0.45 | 5.9 | 0.06 | 10.0 | ⊚ | ⊚ |
| Example 9 | 0.91 | 5400 | 7.1 | 0.01 | 12.5 | 0.44 | 6.0 | 0.06 | 12.0 | ○ | ⊚ |
| Comp. Ex. 1 | 0.88 | 4550 | 6.8 | 0.03 | 12.0 | 0.74 | 6.1 | 0.09 | 11.8 | X | Δ |
| Comp. Ex. 2 | 0.89 | 3700 | 6.8 | 0.04 | 12.6 | 0.92 | 6.1 | 0.09 | 11.7 | X | Δ |
| Comp. Ex. 3 | 0.85 | 3500 | 6.6 | 0.05 | 13.8 | 0.85 | 6.4 | 0.10 | 12.8 | X | X |
| Comp. Ex. 4 | 0.86 | 4300 | 6.9 | 0.03 | 12.8 | 0.76 | 6.2 | 0.09 | 11.3 | X | ○ |
| Comp. Ex. 5 | 0.87 | 4450 | 7.0 | 0.02 | 13.0 | 0.68 | 6.1 | 0.07 | 12.5 | Δ | Δ |
| Comp. Ex. 6 | 0.91 | 4850 | 7.0 | 0.02 | 13.5 | 0.70 | 6.2 | 0.08 | 11.5 | Δ | ○ |
| Comp. Ex. 7 | 0.91 | 4900 | 7.0 | 0.02 | 13.7 | 0.65 | 6.2 | 0.07 | 11.5 | Δ | ○ |
| Comp. Ex. 8 | 0.89 | 4200 | 6.7 | 0.05 | 12.5 | 0.88 | 6.3 | 0.09 | 11.8 | X | Δ |
| Comp. Ex. 9 | 0.91 | 5100 | 7.1 | 0.02 | 13.8 | 0.63 | 6.3 | 0.07 | 12.0 | Δ | ○ |
| Comp. Ex. 10 | 0.90 | 4700 | 6.9 | 0.02 | 13.2 | 0.68 | 6.2 | 0.08 | 12.0 | Δ | Δ |
| Comp. Ex. 11 | 0.81 | 3150 | 6.1 | 0.04 | 10.5 | 0.75 | 5.9 | 0.08 | 11.2 | X | X |

Example 10

A mixture of 194.2 parts by weight of dimethyl terephthalate and 124.2 parts by weight of ethylene glycol (200 mol % to DMT), and 0.0735 part by weight of manganese acetate tetrahydrate (30 mmol % to DMT), were charged into a reactor equipped with a stirrer, rectification column and methanol distillation condenser, and the temperature was slowly raised from 140° C. to 240° C. while distilling out of the reactor the methanol that was generated by the reaction, to accomplish transesterification. After then adding 0.0522 part by weight of phenylphosphonic acid (33 mmol % to DMT), the transesterification reaction was suspended. There was then added 0.0964 part by weight of antimony trioxide (33 mmol % to DMT) to the reaction product, the mixture was transferred to a reactor equipped with a stirrer, nitrogen inlet, pressure reduction valve and distilling apparatus, and the temperature was raised to 290° C. for polycondensation reaction at a high vacuum of below 30 Pa, to obtain a polyester composition. Chips were then prepared by a common method. The obtained polyester chips were observed with a transmission electron microscope, and they contained laminar nanoparticles with lengths of 20 nm and an interlayer distance of 1.5 nm. The results are shown in Table 1.

The obtained polyester chips were dried under a nitrogen atmosphere at 160° C. for 3 hours for pre-crystallization, and further subjected to solid-state polymerization reaction in a vacuum at 230° C. to obtain polyethylene terephthalate composition chips with a limiting viscosity of 1.02.

This was spun from a spinneret with 384 openings having aperture diameters of 1.2 mm, at a polymer melting temperature of 300° C., and was passed through a cylindrical heating zone heated to 300° C., which had a length of 200 mm and was provided directly below the nozzle, after which cooling air at 20° C., 65% RH was blown onto the spun yarn through a cylindrical chimney with a blowing distance of 500 mm, for cooling, a lubricant composed mainly of an aliphatic ester compound was applied to a lubricant coverage of 0.5% on the fiber, and it was taken up onto a roller with a surface temperature of 50° C., at a speed of 2500 m/min. The spun discharged yarn, without being taken up, was immediately subjected to multistage drawing to an overall draw ratio of 2.0 between heated draw rollers with a surface temperature of 60-75° C., and was then heat set at 190° C. and wound up at a take-up speed 5000 m/min to obtain polyester fiber with a fineness of 1670 dtex.

The obtained polyester fiber was observed with a transmission electron microscope, and it contained laminar nanoparticles with lengths of 20 nm, an interlayer distance of 1.5 nm and an average of 11 layers, while no ordinary particulate metal-containing particles were observed. Transmission microscope and X-ray diffraction observation were performed to confirm that the laminar nanoparticles were oriented parallel to the fiber axis. The metal content from manganese acetate was 30 mmol %, and the phosphorus content from phenylphosphonic acid was 30 mmol %, for a P/M ratio of 1.0. The physical properties of the obtained fiber are shown in Table 3.

The obtained polyester fiber was also twisted with a first twist count of 400 turn/m, and doubled with a final twist count of 400 turn/m for twisting to 1670 T/2, to obtain a tire cord. Using warp yarn that consisted of 1500 aligned strands of the tire cord and using weft yarn which consisted of fine spun doubled yarn of polyester fiber and cotton, these were implanted at a spacing of 4 strands/5 cm to obtain a tire fabric comprising a tire cord.

Next the tire fabric was immersed in a mixture comprising an epoxy compound, a block isocyanate compound and a rubber latex (first bath treatment solution) and then dried at 130° C. for 100 seconds and subsequently subjected to stretching and heat treatment at 240° C. for 45 seconds. The tire fabric treated in the first treatment bath was then immersed in a second treatment solution comprising resorcin, formalin and a rubber latex (RFL), and then dried at 100° C. for 100 seconds and subsequently subjected to stretching and heat treatment at 240° C. for 60 seconds for relaxation heat treatment.

Finally, the tire fabric was used as a carcass material, with reinforcement using two steel belts inside the tread, and the tire was filled with air by a common method to produce a radial tire (tire size: 225/60R16). The physical properties of the cord in the obtained tire fabric and the physical properties of the pneumatic tire are summarized in Table 4.

Examples 11-14

Polyester fiber was obtained under the spinning and drawing conditions shown in Table 3, using the same polyester polymer as in Example 10. The obtained fiber contained laminar nanoparticles, and no ordinary particulate metal-containing particles were observed. The results are summarized in Table 3.

A tire cord, fabric and tire were produced in the same manner as Example 10. The evaluation results are summarized in Table 4.

Comparative Examples 12-15

A polyester polymer was obtained in the same manner as Example 10, except that phosphoric acid was added at 60 mmol % to DMT, instead of the phenylphosphonic acid of Example 10. Observation with an electron microscope revealed no laminar nanoparticles, and even where particles were present they had ordinary spherical shapes. Melt spinning and drawing were carried out under the conditions shown in Table 3 in the same manner as Example 10, to obtain polyester fiber. The results are summarized in Table 3.

A tire cord, fabric and tire were produced in the same manner as Example 10. The evaluation results are summarized in Table 4.

TABLE 3

| | Spinning conditions | | | | | Fiber properties | | | | | Form of particles in fiber | | |
| --- | --- | --- | --- | --- | --- | --- | --- | --- | --- | --- | --- | --- | --- |
| No. | Nozzle diameter φmm | Number of nozzle holes | Heating chimney length below nozzle mm | Heating temperature below nozzle ° C. | Spinning speed m/min | IVF dL/g | Tenacity cN/dtex | Breaking elongation % | EASL % | 150° C. Hot air shrinkage | Particle shape | Particle size nm | Interlayer distance nm |
| Example 10 | 1.2 | 384 | 200 | 300 | 2100 | 0.93 | 8.6 | 11.3 | 5.6 | 9.0 | laminar | 20 | 1.5 |
| Example 11 | 1.2 | 384 | 200 | 300 | 2300 | 0.92 | 7.9 | 12.5 | 5.8 | 8.3 | laminar | 19 | 1.5 |

TABLE 3-continued

| | Spinning conditions | | | | | Fiber properties | | | | | Form of particles in fiber | | |
|---|---|---|---|---|---|---|---|---|---|---|---|---|---|
| No. | Nozzle diameter φmm | Number of nozzle holes | Heating chimney length below nozzle mm | Heating temperature below nozzle °C. | Spinning speed m/min | IVF dL/g | Tenacity cN/dtex | Breaking elongation % | EASL % | 150° C. Hot air shrinkage | Particle shape | Particle size nm | Interlayer distance nm |
| Example 12 | 1.2 | 384 | 200 | 280 | 2500 | 0.93 | 7.2 | 13.5 | 6.0 | 7.4 | laminar | 20 | 1.4 |
| Example 13 | 1.4 | 500 | 100 | 300 | 2600 | 0.93 | 7.2 | 12.7 | 5.8 | 6.0 | laminar | 18 | 1.5 |
| Example 14 | 1.4 | 750 | 100 | 300 | 3200 | 0.93 | 5.7 | 17.5 | 6.3 | 3.2 | laminar | 15 | 1.4 |
| Comp. Ex. 12 | 1.2 | 384 | 200 | 300 | 2250 | 0.92 | 7.9 | 12.4 | 5.7 | 8.8 | globular | 850 | — |
| Comp. Ex. 13 | 1.2 | 384 | 200 | 280 | 2450 | 0.91 | 6.9 | 13.3 | 6.0 | 7.7 | globular | 850 | — |
| Comp. Ex. 14 | 1.4 | 500 | 100 | 280 | 2500 | 0.92 | 7.0 | 12.5 | 5.9 | 6.6 | globular | 845 | — |
| Comp. Ex. 15 | 1.4 | 750 | 100 | 300 | 2950 | 0.92 | 5.5 | 17.2 | 6.4 | 4.0 | globular | 830 | — |

TABLE 4

| | Treated cord properties | | | | | Tire performance | | | |
|---|---|---|---|---|---|---|---|---|---|
| No. | Presence of laminar nanoparticles | Strength N | Breaking elongation % | 66N EASL % | 150° C. Hot air shrinkage % | Dimensional stability index* | Uniformity index | Maneuvering stability index | Maintenance of durable force % | Rolling resistance index |
| Example 10 | + | 245 | 13.6 | 3.8 | 3.4 | 7.2 | 95 | 105 | 93 | 99 |
| Example 11 | + | 231 | 14.2 | 3.9 | 3.3 | 7.2 | 94 | 105 | 93 | 98 |
| Example 12 | + | 218 | 15.8 | 4.0 | 2.8 | 6.8 | 93 | 108 | 94 | 96 |
| Example 13 | + | 222 | 15.6 | 3.9 | 2.3 | 6.2 | 92 | 110 | 96 | 94 |
| Example 14 | + | 172 | 18.6 | 3.8 | 1.6 | 5.4 | 88 | 115 | 96 | 92 |
| Comp. Ex. 12 | − | 225 | 13.2 | 4.0 | 3.8 | 7.8 | 100 | 100 | 86 | 100 |
| Comp. Ex. 13 | − | 216 | 15.4 | 4.0 | 3.5 | 7.5 | 99 | 100 | 88 | 100 |
| Comp. Ex. 14 | − | 213 | 14.3 | 4.1 | 3.0 | 7.1 | 95 | 103 | 87 | 99 |
| Comp. Ex. 15 | − | 160 | 18.0 | 4.0 | 2.8 | 6.8 | 92 | 103 | 88 | 98 |

*Dimensional stability index: Sum of 66N EASL (Elongation at Specific Load) and 150° C. hot air shrinkage.

Example 15

A mixture of 194.2 parts by weight of dimethyl terephthalate and 124.2 parts by weight of ethylene glycol (200 mol % to DMT), and 0.0735 part by weight of manganese acetate tetrahydrate (30 mmol % to DMT), were charged into a reactor equipped with a stirrer, rectification column and methanol distillation condenser, and the temperature was slowly raised from 140° C. to 240° C. while distilling out of the reactor the methanol that was generated by the reaction, to accomplish transesterification. After then adding 0.0522 part by weight of phenylphosphonic acid (33 mmol % to DMT), the transesterification reaction was suspended. There was then added 0.0964 part by weight of antimony trioxide (33 mmol % to DMT) to the reaction product, the mixture was transferred to a reactor equipped with a stirrer, nitrogen inlet, pressure reduction valve and distilling apparatus, and the temperature was raised to 290° C. for polycondensation reaction at a high vacuum of below 30 Pa, to obtain a polyester composition. Chips were then prepared by a common method. The obtained polyester chips were observed with a transmission electron microscope, and they contained laminar nanoparticles with lengths of 20 nm and an interlayer distance of 1.5 nm. The results are shown in Table 5.

The obtained polyester chips were dried under a nitrogen atmosphere at 160° C. for 3 hours for pre-crystallization, and further subjected to solid-state polymerization reaction in a vacuum at 230° C. to obtain polyethylene terephthalate composition chips with a limiting viscosity of 1.02.

This was spun from a spinneret with 250 openings having aperture diameters of 1.0 mm, at a polymer melting temperature of 300° C., and was passed through a cylindrical heating zone heated to 300° C., which had a length of 200 mm and was provided directly below the nozzle, after which cooling air at 20° C., 65% RH was blown onto the spun yarn through a cylindrical chimney with a blowing distance of 500 mm, for cooling, a lubricant composed mainly of an aliphatic ester compound was applied to a lubricant coverage of 0.5% on the fiber, and it was taken up onto a roller with a surface temperature of 50° C., at a speed of 2500 m/min. The spun discharged yarn, without being taken up, was immediately subjected to multistage drawing to an overall draw ratio of 2.0 between heated draw rollers with a surface temperature of 60-75° C., and was then heat set at 190° C. and wound up at a take-up speed 5000 m/min to obtain polyester fiber with a fineness of 1100 dtex.

The obtained polyester fiber was observed with a transmission electron microscope, and it contained laminar nanoparticles with lengths of 20 nm, an interlayer distance of 1.5 nm and an average of 11 layers, while no ordinary particulate metal-containing particles were observed. The metal content from manganese acetate was 30 mmol %, and the phosphorus content from phenylphosphonic acid was 30 mmol %, for a P/M ratio of 1.0. Transmission microscope and X-ray diffraction observation were performed to confirm that the laminar nanoparticles were oriented parallel to the fiber axis. The physical properties of the obtained fiber are shown in Table 5.

Next, the polyester fiber was used to obtain a 1100 dtex/2/3 cord (belt-reinforcing fiber material) by twisting with a first twist count of 200 turn/m and a final twist count of 120 turn/m. After applying an epoxy/isocyanate compound as an adhesive treatment agent to the cord, it was subjected to heat treatment at 160° C. for 60 seconds and at 245° C. for 80 seconds, and RFL (resorcin-formalin-latex) was further applied prior to heat treatment at 160° C. for 60 seconds and at 235° C. for 60 seconds. The obtained cord was used as a core to produce the V-belt 1 shown in FIG. 3. The physical properties of the obtained polyester fiber cord and the results of testing the belt tension maintenance factor, belt dimensional change ratio and fatigue resistance of the V-belt are summarized in Table 6.

Examples 16-19

Polyester fiber was obtained under the spinning and drawing conditions shown in Table 5, using the same polyester polymer as in Example 15. The obtained fiber contained laminar nanoparticles, and no ordinary particulate metal-containing particles were observed. The results are summarized in Table 5.

A cord (belt-reinforcing fiber material) and V-belt were also produced in the same manner as Example 15. The evaluation results are summarized in Table 6.

Comparative Examples 16-19

A polyester polymer was obtained in the same manner as Example 15, except that phosphoric acid was added at 60 mmol % to DMT, instead of the phenylphosphonic acid of Example 15. Observation with an electron microscope revealed no laminar nanoparticles, and even where particles were present they had ordinary spherical shapes. Melt spinning and drawing were carried out under the conditions shown in Table 5 in the same manner as Example 15, to obtain polyester fiber. The results are summarized in Table 5.

A cord (belt-reinforcing fiber material) and V-belt were also produced in the same manner as Example 15. The evaluation results are summarized in Table 6.

TABLE 5

| No. | Spinning conditions | | | | | Fiber properties | | | | | Form of particles in fiber | | |
|---|---|---|---|---|---|---|---|---|---|---|---|---|---|
| | Nozzle diameter φmm | Number of nozzle holes | Heating chimney length below nozzle mm | Heating temperature below nozzle °C. | Spinning speed m/min | IVF dL/g | Tenacity cN/dtex | Breaking elongation % | EASL % | 150° C. Hot air shrinkage % | Particle shape | Particle size nm | Interlayer distance nm |
| Example 15 | 1.0 | 250 | 200 | 330 | 2100 | 0.93 | 8.7 | 11.5 | 5.8 | 9.3 | laminar | 18 | 1.5 |
| Example 16 | 1.0 | 250 | 200 | 300 | 2250 | 0.92 | 7.9 | 12.8 | 5.9 | 8.1 | laminar | 18 | 1.5 |
| Example 17 | 1.0 | 250 | 200 | 280 | 2450 | 0.93 | 7.1 | 13.7 | 5.9 | 7.2 | laminar | 19 | 1.5 |
| Example 18 | 1.2 | 384 | 100 | 300 | 2550 | 0.93 | 7.2 | 12.4 | 5.8 | 5.8 | laminar | 18 | 1.5 |
| Example 19 | 0.8 | 500 | 100 | 300 | 3200 | 0.93 | 5.9 | 18.5 | 6.3 | 3.0 | laminar | 16 | 1.5 |
| Comp. Ex. 16 | 1.0 | 250 | 200 | 300 | 2250 | 0.92 | 7.7 | 12.1 | 5.7 | 8.7 | globular | 845 | — |
| Comp. Ex. 17 | 1.0 | 250 | 200 | 280 | 2450 | 0.91 | 6.9 | 13.5 | 6.0 | 7.6 | globular | 850 | — |
| Comp. Ex. 18 | 1.2 | 384 | 100 | 280 | 2500 | 0.92 | 6.9 | 12.3 | 5.8 | 6.4 | globular | 840 | — |
| Comp. Ex. 19 | 0.8 | 500 | 100 | 320 | 2950 | 0.92 | 5.6 | 18.2 | 6.5 | 4.2 | globular | 835 | — |

TABLE 6

| No. | Treated cord properties | | | | | V-Belt properties | | |
|---|---|---|---|---|---|---|---|---|
| | Presence of laminar nanoparticles | Strength N | Breaking elongation % | 118N EASL % | 150° C. Hot air shrinkage % | 150° C. Heat shrinkage stress | Belt tension maintenance factor % | Belt dimensional change rate % | Fatigability % |
| Example 15 | + | 544 | 10.1 | 2.0 | 3.1 | 17 | 80 | 0.22 | 92 |
| Example 16 | + | 495 | 11.5 | 2.1 | 3.0 | 16 | 81 | 0.22 | 92 |
| Example 17 | + | 463 | 12.5 | 2.1 | 2.8 | 16 | 84 | 0.21 | 94 |
| Example 18 | + | 473 | 11.4 | 2.1 | 2.5 | 16 | 88 | 0.18 | 97 |
| Example 19 | + | 390 | 12.7 | 2.0 | 1.8 | 15 | 91 | 0.15 | 99 |
| Comp. Ex. 16 | − | 483 | 11.6 | 2.2 | 3.2 | 15 | 70 | 0.30 | 83 |
| Comp. Ex. 17 | − | 450 | 12.8 | 2.3 | 3.0 | 15 | 74 | 0.27 | 84 |
| Comp. Ex. 18 | − | 442 | 12.7 | 2.3 | 2.9 | 14 | 80 | 0.25 | 85 |
| Comp. Ex. 19 | − | 381 | 12.8 | 2.2 | 2.4 | 15 | 83 | 0.23 | 88 |

The polyester fiber cord (belt-reinforcing fiber material) of the examples of the invention had high force, low shrinkage and high heat shrinkage stress, and were therefore excellent as cores. Furthermore, the physical properties of the V-belts obtained using the belt reinforcing materials of the invention had superior belt tension maintenance factors compared to the comparative examples, and the dimensional stabilities and fatigue resistances of the belts were also notably improved.

Example 20

Using a multifilament comprising the 1100 dtex/250 filament polyester fiber obtained in Example 15, doubled and twisted 50 turn/10 cm as the warp yarn, and an untwisted 1100 dtex/249 filament polyethylene terephthalate multifilament obtained by a common method as the weft yarn, these were woven into a twill weave base fabric at a warp density of 49/5 cm, to obtain a woven fabric as a belt-reinforcing fiber material.

The obtained woven fabric was used as a reinforcing material to produce a belt by a common method. The physical properties of the obtained woven fabric and belt are shown in Table 7.

Example 21, Comparative Examples 20 and 21

Woven fabrics were obtained as belt-reinforcing fiber materials in the same manner as Example 20, except that the polyester fibers obtained in Example 18, Comparative Example 16 and Comparative Example 18 were used instead of the polyester fiber obtained in Example 15.

Each obtained woven fabric was used as a reinforcing material to produce a belt by a common method. The physical properties of each of the obtained woven fabrics and belts are shown in Table 7.

TABLE 7

| No.<br>Fiber used | Example 20<br>(Example 15) | Example 21<br>(Example 18) | Comp. Ex. 20<br>(Comp. Ex. 16) | Comp. Ex. 21<br>(Comp. Ex. 18) |
|---|---|---|---|---|
| Presence of laminar nanoparticles | + | + | − | − |
| Breaking force (woven fabric) (N/mm) | 350 | 290 | 308 | 272 |
| Force uner 1% tension (woven fabric) (N/mm) | 56 | 60 | 50 | 52 |
| Force under 3% tension (woven fabric) (N/mm) | 114 | 123 | 105 | 108 |
| Belt dimensional change rate (%) | 0.21 | 0.18 | 0.32 | 0.27 |
| Fatigability (%) | 94 | 98 | 85 | 89 |

Example 20 and Example 21 show the properties of base fabrics (belt-reinforcing fiber materials) and belts composed of polyester fiber according to the invention. Improvement in the base fabric breaking strength and the strength with 1% and 3% stretching was exhibited compared to the comparative examples, while the belt dimensional stability and fatigue resistance were drastically increased.

INDUSTRIAL APPLICABILITY

The polyester fiber of the invention obtained in the manner described above was polyester fiber of high quality and producible at high efficiency, having few defects such as voids due to catalyst particles, low variation in physical properties and minimal fluff generation. The polyester fiber is highly useful for use in a wide range of industrial materials including woven or knitted fabrics for industrial materials such as seat belts, tarpaulins, fishing nets, ropes and monofilaments.

The polyester fiber of the invention is preferably used together with a polymer to form a fiber/polymer complex. It is particularly suitable as a rubber-reinforcing fiber wherein the polymer is a rubber elastomer, and is optimal for tires, belts and hoses, for example.

Also, according to the invention, it is possible to obtain a polyester tire cord and pneumatic tire that are lightweight, have low rolling resistance and exhibit excellent maneuvering stability, durability and dimensional stability, which are extremely useful for practical use since they can lower the environmental load via energy savings and long-term durability.

Moreover, the belt-reinforcing fiber material of the invention has drastically improved dimensional stability and fatigability, as well as high strength and a high modulus, and belts employing the fiber material of the invention exhibit excellent power transmission efficiency and durability during belt use. These properties provide practical effects including lower environmental load via energy savings and lighter weight, and are therefore highly useful.

What is claimed is:

1. A polyester fiber which is fiber composed of polyester and comprising laminar nanoparticles composed of a divalent metal and a phosphorus compound and having side lengths of 5-100 nm and an interlayer spacing of 1-5 nm.

2. A polyester fiber according to claim 1, wherein the divalent metal is at least one type of metal element selected from the group consisting of metal elements of Periods 4-5 and Groups 3-12 of the Periodic Table, and Mg.

3. A polyester fiber according to claim 1, wherein the divalent metal is at least one metal selected from the group consisting of Zn, Mn, Co and Mg.

4. A polyester fiber according to claim 1, wherein the metal-phosphorus compound is derived from a phosphorus compound represented by the following formula (I)

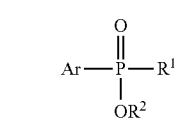

(I)

(In the formula, Ar represents an unsubstituted or substituted C6-20 aryl group, $R^1$ represents hydrogen or OH, and $R^2$ represents hydrogen or an unsubstituted or substituted C1-20 hydrocarbon group).

5. A polyester fiber according to claim 1, wherein the metal-phosphorus compound composing the laminar nanoparticles is a phenylphosphonic acid derivative.

6. A polyester fiber according to claim 1, wherein the metal and phosphorus contents of the polyester satisfy the following inequality (III) and inequality (IV), $$10 \leq M \leq 1000 \quad (III)$$

$$0.8 \leq P/M \leq 2.0 \quad (IV)$$

(In the inequalities, M represents the millimolar percent of the metal element with respect to the dicarboxylic acid component of the polyester, and P represents the millimolar percent of phosphorus element.)

7. A polyester fiber according to claim 1, wherein the main repeating unit of the polyester is selected from the group consisting of ethylene terephthalate, ethylene-2,6-naphthalate, trimethylene terephthalate, trimethylene-2,6-naphthalate, butylene terephthalate and butylene-2,6-naphthalate.

8. A polyester fiber according to claim 1, wherein the polyester is polyethylene terephthalate.

9. A polyester fiber according to claim 1, which has a diffraction peak of $2\theta=5-7°$ in XRD diffraction in the equatorial direction of the fiber.

10. A method for producing a polyester fiber, by melt spinning a polyester comprising laminar nanoparticles, wherein the laminar nanoparticles are composed of a divalent metal and a phosphorus compound, and have shapes with a side length of 5-100 nm and an interlayer spacing of 1-5 nm.

11. A method for producing a polyester fiber according to claim 10, wherein the laminar nanoparticles are internally precipitated by addition of the divalent metal and phosphorus compound during the production process.

12. A tire cord composed of fiber comprising a polyester fiber according to claim 1.

13. A pneumatic tire obtained using a tire cord according to claim 12.

14. A pneumatic tire according to claim 13, wherein the tire cord is used for a belt and/or carcass ply set inside the tread of the pneumatic tire.

15. A belt-reinforcing fiber material composed of fiber comprising a polyester fiber according to claim 1.

16. A belt-reinforcing fiber material according to claim 15, wherein the belt-reinforcing fiber material is a twisted fiber cord.

17. A belt-reinforcing fiber material according to claim 15, wherein the belt-reinforcing fiber material is a woven fabric, and the warp yarn is yarn composed of a polyester fiber.

18. A belt made of a belt-reinforcing fiber material according to claim 15, and a rubber or a resin.

19. A polyester fiber according to claim 2, wherein the divalent metal is at least one metal selected from the group consisting of Zn, Mn, Co and Mg.

* * * * *